US005872417A

United States Patent [19]
Sugaya

[11] Patent Number: 5,872,417
[45] Date of Patent: Feb. 16, 1999

[54] MULTIPLE DEGREES OF FREEDOM VIBRATION ACTUATOR

[75] Inventor: Isao Sugaya, Yokohama, Japan

[73] Assignee: Nikon Corporation, Japan

[21] Appl. No.: 760,628

[22] Filed: Dec. 4, 1996

[30] Foreign Application Priority Data

| | | | |
|---|---|---|---|
| Dec. 4, 1995 | [JP] | Japan | 7-315067 |
| Nov. 10, 1996 | [JP] | Japan | 8-269898 |

[51] Int. Cl.[6] .................... H01L 41/08

[52] U.S. Cl. .................... 310/323; 310/317; 310/316; 310/328; 901/14

[58] Field of Search .................... 310/323, 80, 36, 310/322, 320, 317, 316, 328; 244/167; 901/14

[56] References Cited

FOREIGN PATENT DOCUMENTS

| | | |
|---|---|---|
| 0 691 692 A1 | 7/1995 | European Pat. Off. . |
| 0 718 899 A2 | 12/1995 | European Pat. Off. . |
| 8-23686 | 1/1996 | Japan . |
| 8-126358 | 5/1996 | Japan . |
| 8-126359 | 5/1996 | Japan . |
| 8-182351 | 7/1996 | Japan . |

OTHER PUBLICATIONS

Development of Spherical Ultrasonic Motor, *Tribologist,* vol. 40, No. 8, Shigeki Toyama, 1995, p. 627–631 (partial translation).

Development of a Small Actuator with Three Degrees of Rotational Freedom, Driving Control Method and Abilities of a 3–D.O.F. Actuator, Japanese Mechanics Society, Robotics–Mecatronics Conference, NO. 95–17, Kiyoshi IOI, Keisuke SASAE, Yasuo Ohtsuki and Yoshimitsu Kurosaki, 06/2–23/95 (partial translation).

Interview with Messrs. Usami and Miyadani 1995 (partial translation).

*Primary Examiner*—Mark O. Budd
*Assistant Examiner*—Timothy A. Williams

[57] ABSTRACT

A multiple degrees of freedom vibration actuator capable of motion around multiple axes. The vibration actuator includes a vibration element having drive force output members, and a relative moving member having a curved surface. The curved surface contacts the drive force output member To generate relative motion of the relative moving member with respect to the vibration element. The vibration element includes a frame shaped elastic member having the drive force output members attached thereto, and having electromechanical converting elements contacting the elastic member. When the electromechanical converting elements are excited by a drive voltage, vibrations are generated in the elastic member to produce a drive force which is transmitted To the relative moving member via the drive force output members. The vibration element can be controlled to generate relative motion in various axis directions by selectively controlling the electromechanical converting elements which are excited by a drive voltage.

36 Claims, 30 Drawing Sheets

FOR B21 MODE:

$$\frac{\omega a1}{\omega oo} = \frac{\alpha 21^2}{2.05 x \sqrt{3}} \cdot \left(\frac{h}{2a}\right)$$

t1
t2
t3
t4
t5
t6
t7
t8
t9
10
21b
22b
11
31
32
34
A
B
G
X
Y1
Z1
Y2
Z2
Y
Z

MULTIPLE DEGREES OF FREEDOM VIBRATION ACTUATOR

CROSS REFERENCE TO RELATED APPLICATIONS

This application is based upon and claims priority from Japanese Patent Application No. 7-315067 filed Dec. 4, 1995 and Japanese Patent Application No. 08-269898 filed Oct. 11, 1996, the contents of which are incorporated herein by reference.

BACKGROUND OF THE INVENTION

1. Field of the Invention

The present invention relates to a vibration actuator including a vibration element and a relative moving member which operate as a multiple degrees of freedom type of drive device, and, more particularly, the present invention relates to a vibration actuator which is capable of generating motion around at least two axes with a frame shaped vibration element having a plurality of drive force output members.

2. Description of the Related Art

Rotary type drive devices are known, such as low torque electric motors, which generate high speed rotation to produce a drive force which is output to a driven object via a gear train speed reduction mechanism. However, the conventional rotary type drive devices are bulky and heavy, and have a complicated structure. Further, the speed reduction mechanism of the conventional rotary drive device includes plural gear wheels which generate substantial mechanical noise. Furthermore, play, inertia and the like arise between the gear wheels in the conventional rotary type drive device, resulting in poor accuracy of position determination and responsiveness.

Moreover, a multiple degrees of freedom rotary type drive device is known which generates rotary motion in independent multiple directions (i.e., in a three dimensional X-Y-Z coordinate system, a direction around the X-axis, a direction around the Y-axis, and direction around the Z-axis). However, the multiple degrees of freedom rotary type drive device requires complex transmission mechanisms resulting in increased size, weight, complexity and noisiness of the device.

To eliminate the complex transmission mechanisms of the conventional rotary type drive device, multiple degrees of freedom vibration actuators have been proposed which are small in size and produce a high torque. FIG. 33 is a diagram showing an example of a prior art multiple degrees of freedom type vibration actuator.

As shown in FIG. 33, the known vibration actuator 200 includes a spherical rotor 201 and four annular stators 202*a,* 202*b,* 202*c* and 202*d* which support the rotor 201. Piezoelectric elements (not shown in the drawing) are adhered to each stator 202*a*–202*d* on the side facing the rotor 201. The piezoelectric elements are spatially polarized so as to produce cosine components and sine components in each half cycle of an alternating voltage impressed on the piezoelectric element. More specifically, by respectively impressing two high frequency voltages in the ultrasonic region on the piezoelectric elements, a time and phase advancing traveling wave is excited in the stators 202*a*–202*d.* A force which rotates the rotor 201 is transmitted from the stators 202*a*–202*d* to the rotor 201 by the contact between the wave front of the traveling wave and the contact portion of the rotor 201. Motion having two degrees of freedom is produced by the vibration actuator 200 shown in FIG. 33 in the two sets of mutually opposite stators 202*a,* 202*b* and 202*c,* 202*d* by the input of the same drive signal. The drive force of the vibration actuator 200 is output by the oscillating motion of an output member 203.

The prior art vibration actuator shown in FIG. 33 is small in size in comparison with a rotary drive device in which an electromagnetic motor is used. However, because four stators 202*a*–202*d* are necessary, a sufficiently small in size and light weight vibration actuator can not be achieved by the vibration actuator shown in FIG. 33. Moreover, the motion of the rotor 201 obtained with the prior art vibration actuator 200 has only two degrees of freedom, and motion around the Z-axis is not possible. Therefore, the number of applications and the types of application of the prior art vibration actuator 200 are limited.

Further, the four stators 202*a*–202*d* are affixed to the rotor 201. As a result, the rotating portion of the vibration actuator 200 becomes heavy and its inertia becomes large, resulting in large losses of drive efficiency. Still further, a drive force from the vibration actuator 200 shown in FIG. 33 is output only by the oscillating motion of an output member 203 which protrudes from an exterior surface of the rotor 201. Thus, the output can only be transmitted to a driven object by directly coupling the rotor 201 to the driven object.

SUMMARY OF THE INVENTION

It is an object of the present invention to provide a vibration actuator having multiple degrees of freedom which is small in size, and which solves the problems of prior art vibration actuators.

Additional objects and advantages of the invention will be set forth in part in the description which follows, and, in part, will be obvious from the description, or may be learned by practice of the invention.

Objects and advantages of the present invention are achieved in accordance with embodiments of the present invention with a vibration actuator including a vibration element and a relative moving member which is driven by the vibration element. The vibration element includes a drive force output member which outputs driving force in at least two axes directions. The relative moving member includes a curved surface formed in at least a portion of the relative moving member. Driving force is transmitted to relative moving member when the curved surface comes into contact with the driving force output member. The relative motion member may have a spherical shape. Further, the vibration element may include three, four or five driving force output members.

In accordance with embodiments of the present invention, the vibration element includes electromechanical converting elements attached thereto which convert electrical energy into mechanical movement. The relative moving member is driven by vibration of the driving force output member, including longitudinal vibration and bending vibration. The minimum natural frequency among the natural frequencies of vibration of the driving force output member is preferably set higher than the drive frequency range of the vibration element. The minimum natural frequency among the natural frequencies of vibration of the driving force output member may be made the resonant frequency of the bending vibration mode, The vibration actuator further comprises a compression member to cause compressive contact between the relative moving element and the vibration element. Still further, the vibration actuator includes a rotary support member which is connected to the compression member and is in rotational contact with the relative moving member to rotationally support the relative moving member. Moreover, a rotary transmission member can also be disposed between the driving force output member and the relative moving element to smoothly transmit drive force to the relative moving member. The rotary transmission member may be spherical in shape.

In accordance with embodiments of the present invention, the vibration element is frame shaped having a polygonal external form, and at least opposite sides have members of rectangular parallelopipedal form. The frame shaped vibration element includes elastic members having the driving force output members at predetermined positions, and electromechanical converting elements contacting a surface of the elastic members, which are excited by an impressed drive voltage. The excitation of the electromechanical converting elements generates in the elastic member a longitudinal vibration in a direction approximately parallel to an approximately planar surface which includes points of contact between the driving force output member and the relative moving member, and generates a bending vibration in a direction which intersects the approximately planar surface, the longitudinal and bending vibrations generate a drive force to produce relative motion between the driving force output member and the relative moving member.

In accordance with embodiments of the present invention, the vibration element formed in a rectangular parallelopipedal form can include an elastic member having the driving force output member in a predetermined position, and an electromechanical converting element which is excited by the impression of drive voltage joined to a surface of the elastic member. In response to a first drive voltage impressed on the electromechanical converting element, longitudinal vibration is generated in a direction approximately parallel to the approximately planar surface which includes points of contact between the driving force output member and the relative moving member, and a bending vibration is generated in a direction intersecting the approximately planar surface, the longitudinal vibration and the bending vibration generate a relative motion between the driving force output member and the relative moving member in a first direction. In response to a second drive voltage impressed on the electromechanical converting element, longitudinal vibration is generated in a direction approximately parallel to the approximately planar surface which includes the points of contact between the driving force output member and the relative moving member, and a bending vibration is generated in a direction intersecting the approximately planar surface, the longitudinal vibration and the bending vibration generating a relative motion between the driving force output member and the relative moving member in a second direction.

In accordance with embodiments of the present invention, the vibration element is formed in an annular shape, and includes an annular shaped elastic member having the driving force output member in a predetermined position, and an electromechanical converting element joined to a surface of the elastic member. When the electromechanical converting element is excited by a voltage, a longitudinal vibration is generated in a surface of the elastic member which is about parallel to a standard surface in which the annular shape is formed. The longitudinal vibration causes a displacement of the elastic member in a direction in which the diameter of the annulus widens and in a direction in which the diameter of the annulus contracts, and generates bending vibration in a direction which intersects the direction of the longitudinal vibration. The bending vibration has one (1) or more nodal circles and one (1) or more nodal diameters. The longitudinal and bending vibration generate a drive force which causes relative motion between the driving force output member and the relative moving member.

In accordance with embodiments of the present invention, the vibration element is annular shaped and includes an annular shaped elastic member having a driving force output member and electromechanical converting elements attached thereto. Excitation of the electromechanical converting elements generates a non-axisymmetric vibration in the elastic member in a surface about parallel to a standard surface formed in the annular shape. The non-axisymmetric vibration causes displacement of the elastic member in the non-axisymmetric direction. Further, excitation of the electromechanical converting element generates bending vibration in the annular shaped elastic member in a direction which intersects the direction of vibration of the non-axisymmetric vibration. The bending vibration has one or more nodal circles, and one or more nodal diameters. The non-axisymmetric vibration and the bending vibration generate a drive force to produce relative motion between the driving force output member and the relative moving member.

In accordance with embodiments of the present invention, the driving force output member is formed at an inner edge portion of the frame shaped vibration element.

In accordance with embodiments of the present invention, the relative moving member can be used in an optical correction device of an optical instrument.

In accordance with embodiments of the present invention, the relative moving member can be used in a rotary coupling unit of a robot hand.

In accordance with embodiments of the present invention, since a curved surface is formed in at least one portion of the relative moving member, and because this curved surface is in contact with driving force output members which transmit driving force in at least two axes directions, a multiple degrees of freedom vibration actuator can be provided which is small in size.

For example, in operation of a vibration actuator in accordance with embodiments of the present invention, when providing an input to generate motion in one direction (e.g., an X-axis direction), the relative moving member performs a rotary motion around an axis (i.e., around the Y-axis) approximately intersecting the motion direction. Thus, a smaller size can be achieved.

Furthermore, these movements of the vibration actuator can be selectively freely changed.

In accordance with embodiments of the present invention, a vibration actuator having a single unitary vibration element which generates motion along plural axes directions, in comparison with the prior art drive device in which plural annular vibration elements are required to generate motion in plural directions, provides a smaller size, lighter weight, simplified and lower cost, vibration actuator.

Moreover, in accordance with embodiments of the present invention, because only one vibration actuator is in contact with the relative moving member, it is possible to increase the degrees of freedom in the design of the motion or shape (for example, a hollow shape, and the like), and application to various purposes is possible.

Furthermore, in accordance with embodiments of the present invention, when disposing rotation transmission members between the vibration actuator and the relative moving member, the driving force output member and the relative moving member can be made to come into contact uniformly, and damage to the relative moving member itself can avoided.

BRIEF DESCRIPTION OF THE DRAWINGS

These and other objects and advantages of the invention will become apparent and more readily appreciated from the following description of the preferred embodiments, taken in conjunction with the accompanying drawings, of which:

FIG. 31 shows locations of force output members on the elastic member.

FIGS. 31A–31D are graphs illustrating the operation of the vibration actuator in accordance with the tenth embodiment of the present invention.

DETAILED DESCRIPTION OF THE PREFERRED EMBODIMENTS

Figure 1:
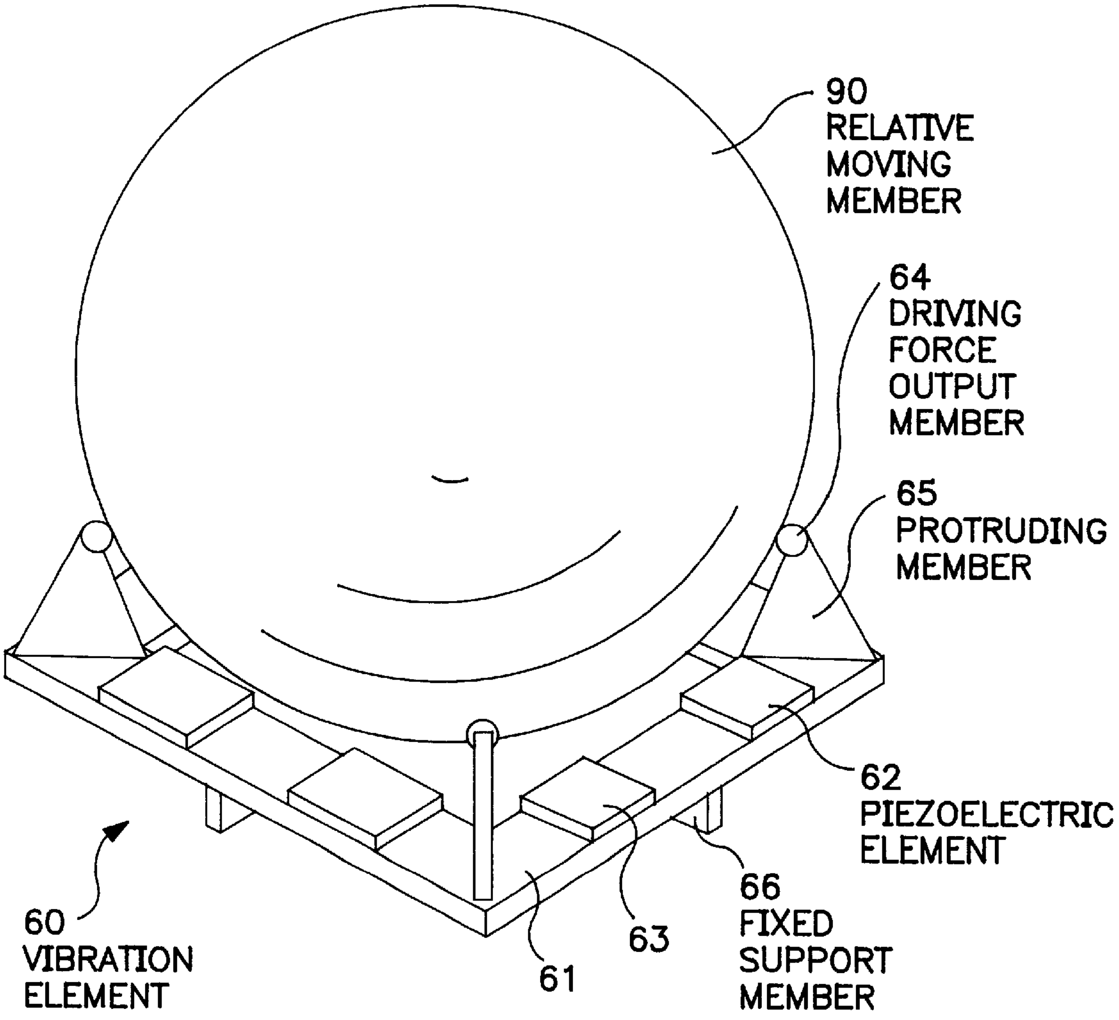
FIG. 1 is an oblique view of a multiple degrees of freedom vibration actuator type of drive device in accordance with a first embodiment of the present invention.

Reference will now be made in detail to the preferred embodiments of the present invention, examples of which are illustrated in the accompanying drawings wherein like reference numerals refer to the same or similar elements throughout.

In accordance with embodiments of the present invention, the multiple degrees of freedom vibration actuator type of drive devices are preferably ultrasonic actuators which operate in the ultrasonic wave vibration region. However, the vibration actuators in accordance with embodiments of the present invention are not limited to ultrasonic actuators.

FIG. 1 is an oblique view of a multiple degrees of freedom vibration actuator type of drive device in accordance with a first embodiment of the present invention. The multiple degrees of freedom vibration actuator type of drive device comprises a spherical relative moving member 90, and a vibration element 60 which confers drive force on the relative moving member 90. The vibration element 60 and the relative moving member 90 operate as a vibration actuator in accordance with the first embodiment of the present invention. The vibration element 60 comprises an elastic frame member 61 which produces a drive force to drive the spherical relative moving member 90 when longitudinal vibrations and bending vibrations are generated in the elastic frame member 61, as described in detail below.

Figure 2B:
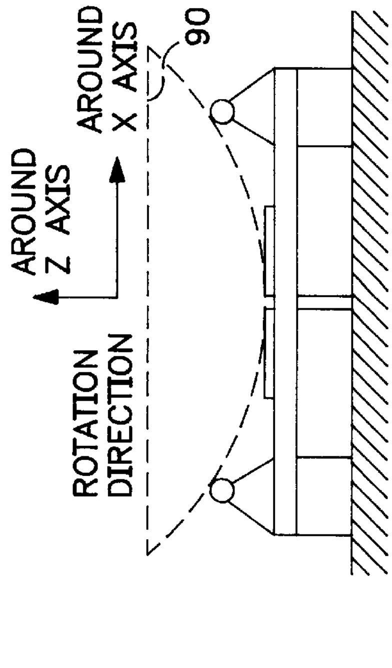
FIG. 2B is a view of the vibration actuator shown in FIG. 1 along a Y-axis In accordance with the first embodiment of the present invention.
Figure 2C:
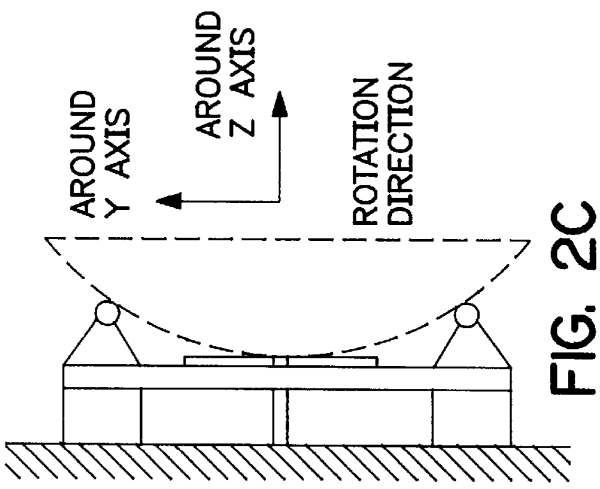
FIG. 2C is a view of the vibration actuator shown in FIG. 1 along an X axis in accordance with the first embodiment of the present invention.
Figure 2A:
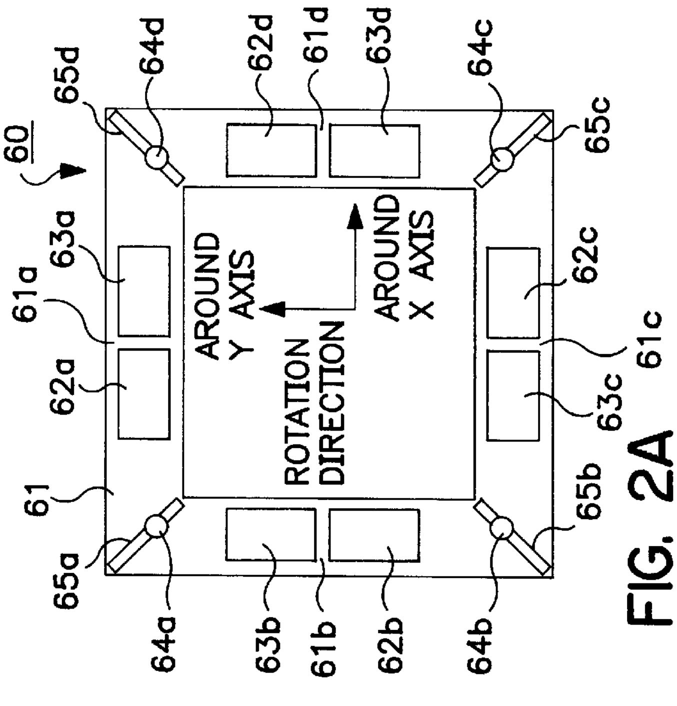
FIG. 2A is a view of the vibration actuator shown in FIG. 1 along a Z-axis in accordance with the first embodiment of the present invention.

FIGS. 2A–2C are diagrams of the multiple degrees of freedom vibration actuator in accordance with the first embodiment of the present invention. More specifically, FIG. 2A is a view of the vibration actuator along a Z-axis direction; FIG. 2B is a view of the vibration actuator along a Y-axis direction; and, FIG. 2C is a view of the vibration actuator along an X-axis direction.

The vibration element 60 in accordance with the first embodiment of the present invention includes an elastic member 61 which forms a frame in the shape of a regular quadrangle having four frame side portions 61*a*, 61*b*, 61*c*, and 61*d*. A pair of piezoelectric elements are joined to the respective upper surfaces of each of the four frame side portions 61*a*, 61*b*, 61*c* and 61*d*. Specifically, piezoelectric elements 62*a* and 63*a* are joined to frame side portion 61*a*; piezoelectric elements 62*b* and 63*b* are joined to frame side portion 61*b*; piezoelectric elements 62*c* and 63*c* are joined to frame side portion 61*c*; and, piezoelectric elements 62*d* and 63*d* are joined to frame side portion 61*d*. The piezoelectric elements 62*a*–63*d* are electromechanical converting elements which convert electrical energy into mechanical motion, and are formed of any PZT (lead zirconate titanate) in a thin film form.

The elastic member 61 includes projecting members 65*a*, 65*b*, 65*c* and 65*d* which are located close to the vertices of the upper surface of the elastic member 61 and extend perpendicularly from the upper surface of the elastic member 61. Driving force output members 64*a*, 64*b*, 64*c* and 64*d* are attached to the ends of projecting members 65*a*, 65*b*, 65*c* and 65*d*, respectively. Fixed support members 66*a*, 66*b*, 66*c* and 66*d* are disposed at the centers of the lower surfaces of the four frame side portions 61*a*, 61*b*, 61*c* and 61*d*, respectively, of the elastic member 61.

Figure 12:
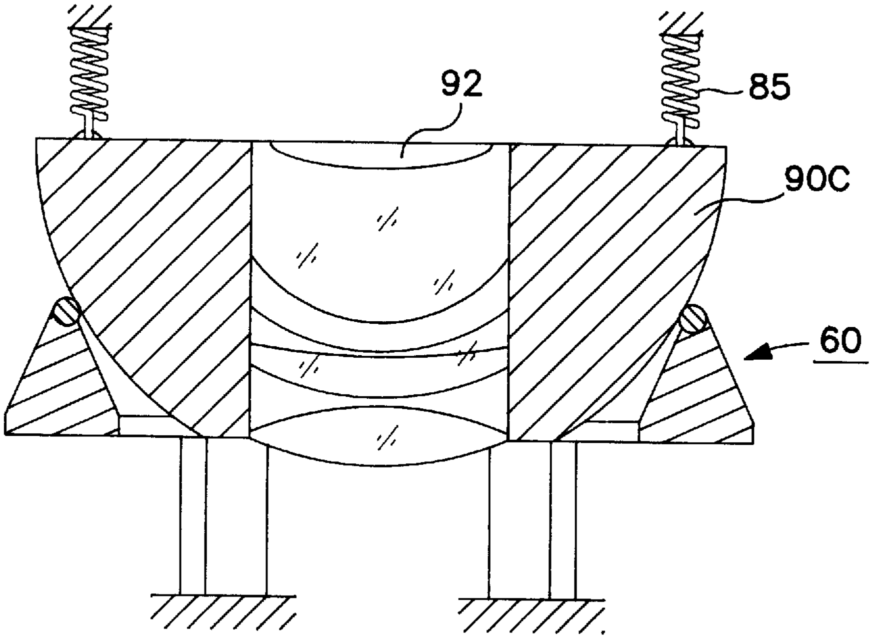
FIG. 12 is a cross sectional diagram of the multiple degrees of freedom vibration actuator type of drive device in accordance with the fifth embodiment of the present invention.

In accordance with the first embodiment of the present invention, the elastic member 61 has the form of a regular quadrangular frame plate, and is manufactured using metal, plastic or the like elastic materials. The frame shape of the elastic member 61 allows various devices or elements to be incorporated within the frame. For example, the frame shaped elastic member 61 may have a lens barrel incorporated within the frame, as shown in FIG. 12 and described in more detail below. Further, when a lens barrel is assembled and incorporated within the frame formed by the elastic member 61 of the vibration actuator, the size of the device can be kept as small as possible.

Longitudinal vibrations and bending vibrations are generated in the elastic member 61 by impressing drive voltages on the piezoelectric elements 62*a* and 63*a*, 62*b* and 63*b*, 62*c* and 63*c*, and 62*d* and 63*d*. The longitudinal vibrations and bending vibrations combine to produce elliptical motions.

It is important that the longitudinal vibrations and bending vibrations coincide to as great a degree as possible. Therefore, to make the longitudinal vibrations and the bending vibrations coincide as much as possible, suitable values of the dimensions of the elastic member 61 (the external length, internal length and plate thickness, etc) should be selected by analyzing the vibrations occurring in the frame side portions 61*a*–61*d* of the elastic member 61 and the resonant frequency of each individual frame portion side 61*a*, 61*b*, 61*c* and 61*d*.

In each respective frame side portion 61*a*–61*d* adjacent piezoelectric elements 62*a* and 63*a*, 62*b* and 63*b*, 62*c* and 63*c*, and 62*d* and 63*d* are separated by a mutually fixed distance. Moreover, in each respective frame side portion 61*a*–61*d*, adjacent piezoelectric elements 62*a* and 63*a*, 62*b* and 63*b*, 62*c* and 63*c*, and 62*d* and 63*d* are polarized, and 2-phase high frequency input voltages A, B having a phase difference of $\pi/2$ are impressed on respective adjacent piezoelectric elements.

The respective adjacent piezoelectric elements 62*a* and 63*a*, 62*b* and 63*b*, 62*c* and 63*c*, and 62*d* and 63*d* are polarized so that their polarities are mutually in the same direction. However, the respective adjacent piezoelectric elements 62*a* and 63*a*, 62*b* and 63*b*, 62*c* and 63*c*, and 62*d* and 63*d* may be polarized in mutually opposite directions.

The driving force output members 64*a*, 64*b*, 64*c* and 64*d* transfer the elliptical motions of the elastic member 61 arising from the combined longitudinal vibrations and bending vibrations generated in the elastic member 61, The driving force output members 64*a*–64*d* are placed in compressive contact with the relative moving member 90 by a compression device (not shown in the drawing), and generate relative motions of the relative moving member 90 as a result of their compressive contact with the relative moving member 90. In accordance with embodiments of the present invention, the driving force output members 64*a*–64*d* are made of a material having good wear resistance, such as silicon nitride. Further, the tips of the driving force output members 64*a*–64*d* which are in contact with the relative moving member 90 comprise curved surfaces so as to avoid obstructing the elliptical motion to as great an extent as possible.

The driving force output members 64*a*–64*d* are located at fixed positions adjacent to the vertices of the regular quadrangle which forms the upper surface of the elastic member 61. To efficiently transmit the drive force of the elastic member 61 the positions of the vertices are selected to avoid the nodes of the longitudinal vibration which arise in the elastic member 61. In accordance with the first embodiment of the present invention, the positions of the vertices of the elastic member 61 are selected at the antinode of the up and down vibration arising due to the bending vibration, which is approximately perpendicular with respect to the plane of movement.

Figure 3D:
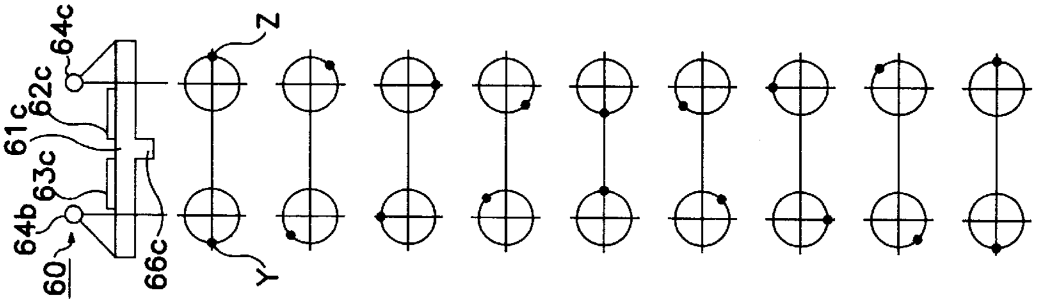
FIGS. 3A–3D are graphs illustrating the operation of the vibration actuator in accordance with the first embodiment of the present invention.
Figure 3C:
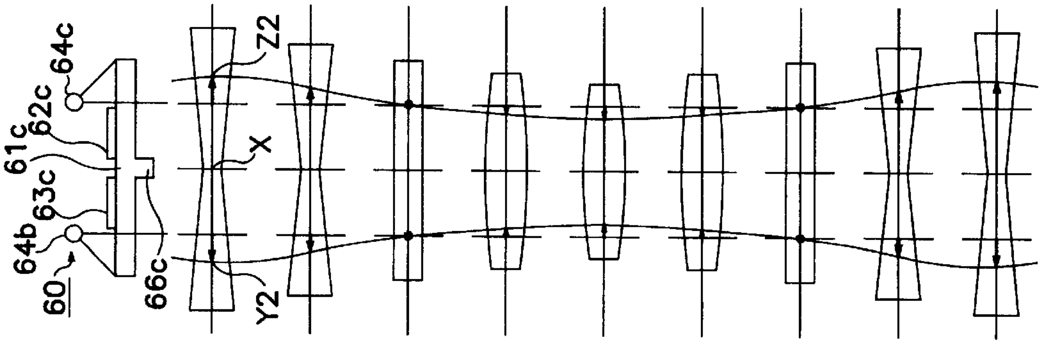
Figure 3B:
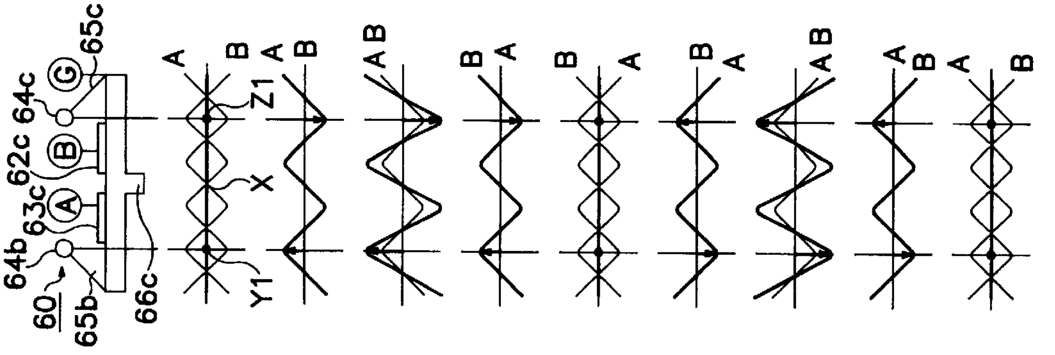
Figure 3A:
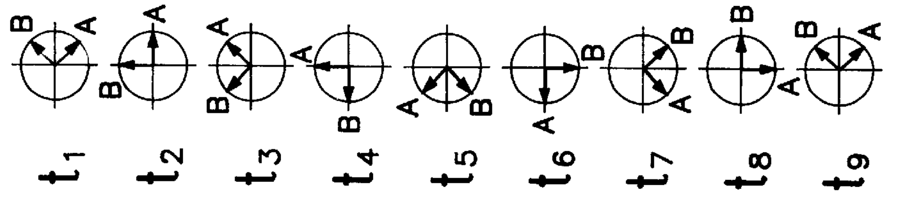

The generation of elliptical motion in the vibration element 60 will now be described below with reference to FIGS. 3A–3D which illustrate the bending vibrations, the longitudinal vibrations and the elliptical motion generated in the vibration element 60 when 2-phase high frequency voltages A, B are input to the vibration element 60. FIG. 3A shows the change with respect to time (from time t1 through t9) of the 2-phase high frequency voltages A, B input to the vibration element 60. In FIG. 3A, the effective values of the high frequency voltages A, B are represented on the abscissa. FIG. 3B illustrates the deformation of a cross section of the vibration element 60 with respect to time (time t1 through time t9) as a result of the bending vibration generated in the vibration element 60. FIG. 3C illustrates the deformation of a cross section of the vibration element 60 with respect to time (time t1 through time t9) as a result of the longitudinal vibration generated in the vibration element 60. FIG. 3D illustrates the changes with respect to time (Time t1 through Time t9) of the elliptical motion generated in the driving force output members 64*b,* 64*c* as a result of the combined bending vibration and longitudinal vibration.

The generation of elliptical motion in the vibration element 60 in accordance with the first embodiment of the present invention will now be described with reference to FIGS. 3A–3D for time t1 through time t9. It is noted that although FIGS. 3A–3D illustrate elliptical motion generated in frame side portion 61*c,* the description of the elliptical motion of frame side portion 61*c* also applies to frame side portions 61*a,* 61*b* and 61*d.* Specifically, when the drive voltages A, B are independently impressed on the piezoelectric elements 62*a* and 63*a,* 62*b* and 63*b,* 62*c* and 63*c,* and 62*d* and 63*d* disposed on the respective frame side portions 61*a*–61*d,* similar deformations occur in all the respective frame side portions 61*a*–61*d.* Accordingly, duplicate descriptions for the other frame side portions 61*a,* 61*b* and 61*d* are omitted.

As shown in FIG. 3A, at time t1, the high frequency voltage A is a positive voltage, and, similarly, the high frequency voltage B is the same positive voltage. As shown in FIG. 3B, at time t1, the bending vibrations due to the high frequency voltages A, B combine to mutually cancel, and the respective amplitudes of the material point Y1 and the material point Z1 are zero. Further, as shown in FIG. 3C, at time t1, the longitudinal vibration due to the high frequency voltages A, B arises in the direction of elongation. At time t1, the material point Y2 and the material point Z2 show maximum elongation, as indicated by the arrows, with the node X as the center. As shown in FIG. 3D, the bending vibration and the longitudinal vibration combine, and the combination of the motions of the material point Y1 and the material point Y2 become the motion of the material point Y. Furthermore, the combination of the motions of the material point Z1 and the material point Z2 become the motion of the material point Z.

At time t2, as shown in FIG. 3A, the high frequency voltage B is zero, and the high frequency voltage A is a positive voltage. As shown in FIG. 38, at time t2, a bending vibration is generated by the high frequency voltage A, causing the material point Y1 to oscillate in the positive direction, and causing the material point Z1 to oscillate in the negative direction. As shown in FIG. 3C, a longitudinal vibration arises due to the high frequency voltage A, and the material point Y2 and the material point Z2 contract more than at the time t1. As shown in FIG. 3D, the bending vibration and the longitudinal vibration are combined, and the material point Y and the material point Z move in the counterclockwise direction from their respective positions at time t1.

At time t3, as shown in FIG. 3A, the high frequency voltage A is a positive voltage, and the high frequency voltage B is a negative voltage having the same voltage value as the high frequency voltage A. As shown in FIG. 3B, the bending vibrations generated due to the high frequency voltages A and B combine and are amplified. Specifically, the material point Y1 is amplified in the positive direction more than at time t2, and exhibits a maximum positive amplitude value. Moreover, the material point Z1 is amplified in the negative direction more than at time t2, and exhibits a maximum negative amplitude value, As shown in FIG. 3C, at time t3, the longitudinal vibrations generated due to the high frequency voltages A, B combine and mutually cancel, and the material points Y2 and Z2 return to their respective original positions As shown in FIG. 3D, the bending vibration and the longitudinal vibration generated at time t3 combine, and the material point Y and the material point Z move further counterclockwise from their respective positions at time t2.

At time t4, as shown in FIG. 3A, the high frequency voltage A becomes zero, and the high frequency voltage B is a negative voltage. As shown in FIG. 3B, a bending vibration is generated as a result of the high frequency voltage B, and the material point Y1 has a lower positive amplitude than at time t3, while the material point Z1 has a lower negative amplitude than at time t3. Moreover, as shown in FIG. 3C, a longitudinal vibration is generated by the high frequency voltage B, and the material point Y2 and the material point Z2 contract. As shown in FIG. 3D, the bending vibration and the longitudinal vibration are combined, and the material point Y and the material point Z move further counterclockwise from their respective positions at time t3.

At time t5, as shown in FIG. 3A, the high frequency voltage A is a negative voltage, and, similarly, the high frequency voltage B is the same negative voltage. As shown in FIG. 3B, the bending vibrations due to the high frequency voltages A and B mutually cancel, and the respective amplitudes of the material point Y1 and the material point Z1 are zero. Moreover, as shown in FIG, 3C, the longitudinal vibration due to the high frequency voltages A, B causes the material points Y2 and Z2 to contract further from their respective positions at time t4, such that the material point Y2 and the material point Z2 are at a maximum contraction, as shown by the arrows, with the node X as the center. As shown in FIG. 3D, the bending vibration and the longitudinal vibration are combined, and the material point Y and the material point Z move further counterclockwise from their respective positions at time t4.

During times t6–t9, changes in the elastic member 61*c* occur from the bending vibration and the longitudinal vibration in a manner similar to that described above for times t1–t5. As a results as shown in FIG. 3D, the material point Y and the material point Z move counterclockwise, and an elliptical motion is generated.

In accordance with the above-described principles, the vibration element 60 generates a drive force via the elliptical motion in the tips of the driving force output members 64*a*–64*d*. Accordingly, when the relative moving member 90 is pressed onto the tips of the driving force output members 64*a*–64*d* by the compressive force of a compression device (not shown), the elastic member 61 causes the relative moving member 90 to rotate.

As shown in FIGS. 1 and 2, the four driving force output members 64*a*–64*d* extend from the four corners of the elastic member 61 via projecting members 65*a*–65*d*, respectively. Each respective frame side portion 61*a*–61*d* undergoes bending vibration and longitudinal vibration, as shown in FIGS. 3A–3D, and each driving force output member 64*a*–64*d* undergoes elliptical motion, as shown in FIG. 3D. Further, each driving force output member 64*a*–64*d*, while undergoing elliptical motion as described above, contacts approximately equally the spherical relative moving member 90, as shown in FIGS. 1 and 2.

In accordance with the first embodiment of the present invention, elliptical motion is generated in the X-direction in the vibration element 60 by respectively impressing the high frequency voltages A and B at a $\pi/2$ phase difference on the piezoelectric elements 62*a* and 63*a*, and piezoelectric elements 62*c* and 63*c*. Specifically, the frame side portions 61*a* and 61*c* respectively generate the combined bending vibration and longitudinal vibration to produce elliptical motion in the X-direction at the tips of driving force output members 64*a*–64*d*. Further, elliptical motion is generated in the Y-direction at the tips of the driving force output members 64*a*–64*d* by respectively impressing the high frequency voltages A and B at a $\pi/2$ phase difference on the piezoelectric elements 62*b* and 63*b*, and the piezoelectric elements 62*d* and 63*d*. Specifically, the frame side portions 61*b* and 61*d* respectively generate the combined bending vibration and longitudinal vibration to produce elliptical motion in the Y-direction at the tips of driving force output members 64*a*–64*d*.

The control of the piezoelectric elements 62*a*, 63*a* and 62*c*, 63*c* which generate elliptical motion in the X-direction is performed mutually independently from the control of the piezoelectric elements 62*b*, 63*b* and 62*d*, 63*d* which generate elliptical motion in the Y-direction. Accordingly, respective independent movements may be generated in the X-direction and the Y-direction. However, the control of movement in the X-direction and the Y-direction may be performed at the same time. When control of piezoelectric elements 62*a*, 63*a* and 62*c*, 63*c* which generate elliptical movement in the X-direction is simultaneously performed with control of piezoelectric elements 62*b*, 63*b* and 62*d*, 63*d*, which generate elliptical motion in the Y-direction, movement is in a direction which is a combination of the X-direction and the Y-direction.

Figure 4:
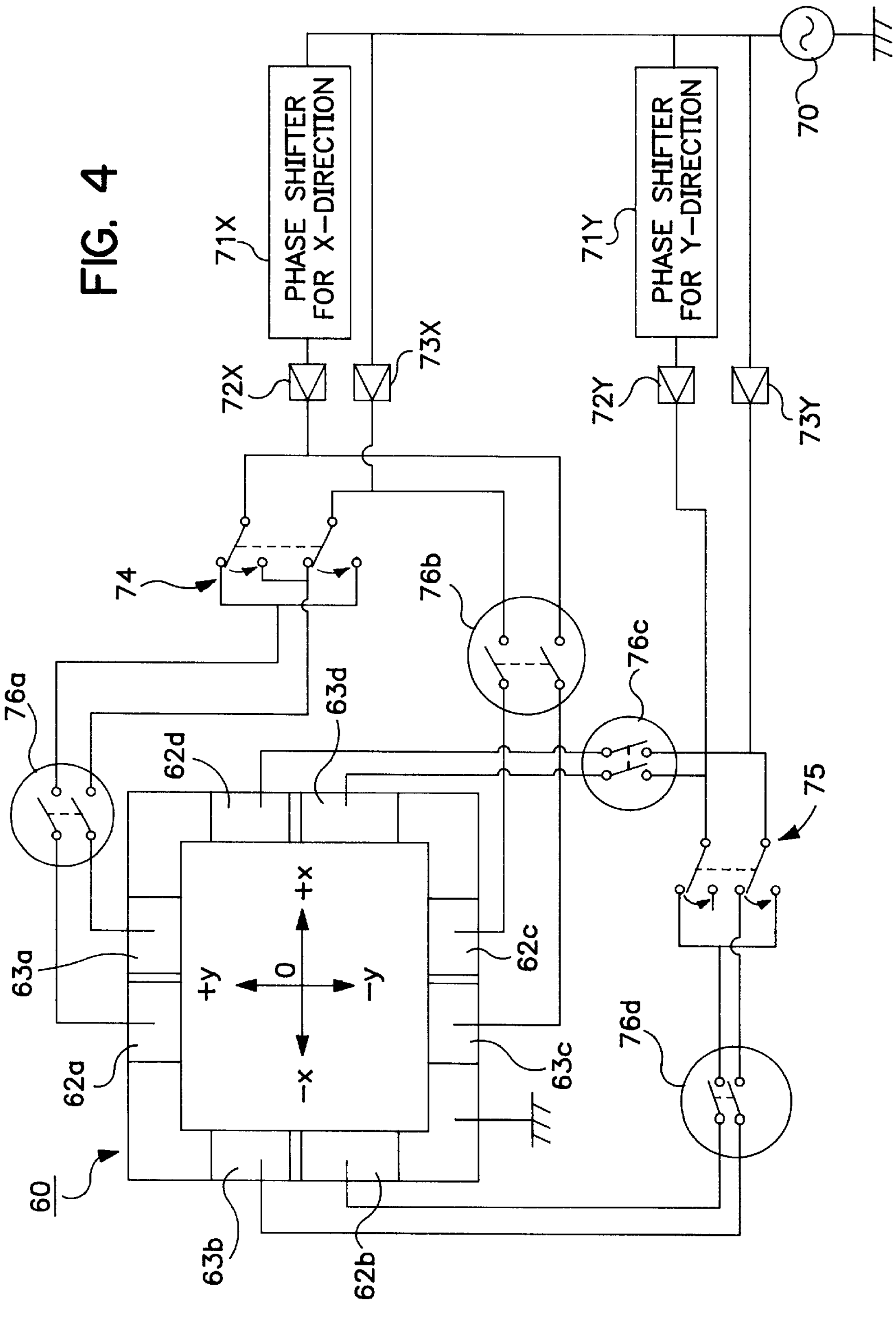
FIG. 4 is a circuit diagram of a drive circuit for the vibration actuator in accordance with the first embodiment of the present invention.

FIG. 4 is a circuit diagram of a drive circuit for a multiple degrees of freedom vibration actuator type of drive device in accordance with The first embodiment of the present invention. More particularly, FIG. 4 shows a drive circuit for impressing drive voltages on the respective piezoelectric elements 62*a*–62*d*, 63*a*–63*d*.

As shown in FIG. 4, an oscillator 70 generates a high frequency voltage A, B which is output to the respective piezoelectric elements 62*a*–62*d*, 63*a*–63*d*. The high frequency voltage output from the oscillator 70 is branched to amplifiers for X-direction movement and to amplifiers for Y-direction movement. Specifically, the high frequency voltage output from the oscillator 70 is input to a phase shifter 71X for the X-direction and to a phase shifter 71Y for the Y-direction which respectively phase shift the output from the oscillator 70 by $\pi/2$. The output from the X-direction phase shifter 71X and Y-direction phase shifter 71Y are respectively input to an amplifier 72X for X-direction use and to an amplifier 72Y for Y-direction use. Further, the output from the oscillator 70 is directly connected to an amplifier 73X for X-direction use and to an amplifier 73Y for Y-direction use.

The respective amplifiers 72X, 73X, 72Y, 73Y are connected, via selection switches 74, 75, and selection switches 76*a*, 76*b*, 76*c*, 76*d*, to respective piezoelectric elements 62*a*–62*d*, 63*a*–63*d*. The selection switches 76*a*–76*d* are normally all in the ON state.

When the selection switch 74 is set to the upper position in FIG. 4, the high frequency voltages A, B are impressed on the piezoelectric elements 62*a*, 63*c*, and the piezoelectric elements 63*a*, 62*c*. The vibration element 60 undergoes translational movement in the ±X-direction when high frequency voltages A, B are impressed on the piezoelectric elements 62*a*, 63*c* and 63*a*, 62*c*, thereby driving the relative moving member 90 in rotation around the Y-axis of FIG. 2.

When the selection switch 74 is set to the lower position in FIG. 4, the high frequency voltages A, B are impressed on the piezoelectric elements 63*a*, 63*c* and on the piezoelectric elements 62*a*, 62*c*. The vibration element 60 thereby drives the relative moving member 90 in rotation around the Z-axis of FIG. 2, with the center portion O as a rotation center.

When the selection switch 75 is set to the upper position in FIG. 4, the high frequency voltages A, B are impressed on the piezoelectric elements 63*b*, 62*d*, and the piezoelectric elements 62*b*, 63*d*. The vibration element 60 undergoes translational movement in the ±Y-direction as a result of the high frequency voltages A, B, thereby driving the relative moving member 90 in rotation around the X-axis of FIG. 2.

When the selection switch 75 is set to the lower position in FIG. 4, the high frequency voltages A, B are impressed on the piezoelectric elements 63*b*, 63*d* and on the piezoelectric elements 62*b*, 62*d*. The vibration element 60 drives the relative moving member 90 in rotation around the Z-axis of FIG. 2, with the center portion O as a rotation center.

Moreover, by setting the selection switches 76*a*–76*d* OFF, it is also possible to impress drive voltages on only one or the other of the opposed pairs of piezoelectric elements 63*b*, 63*d* and piezoelectric elements 62*b*, 62*d*.

In the above-described manner, in accordance with the first embodiment of the present invention, rotation can be generated in one or both directions of rotation around the X-axis and around the Y-axis by impressing drive voltages such that the opposite piezoelectric elements move in the same direction. Moreover, by impressing drive voltages such that the opposite piezoelectric elements move in mutually opposite directions, it is possible To cause rotation around the Z-axis. Accordingly, by freely and selectively changing the motions generated by the piezoelectric elements, and by impressing drive voltages on the piezoelectric elements simultaneously in various combinations, very high degrees of freedom of rotational driving can be attained.

In accordance with embodiments of the present invention, by setting the resonant frequency of the bending vibration higher than the drive frequency zone of the vibration element 60, bending deformation of the projecting members 65*a*–65*d* practically does not arise, and the projecting members 65*a*–65*d* can transmit with high efficiency the elliptical motion received from each frame side portion 61*a*–61*d*.

Figure 5:
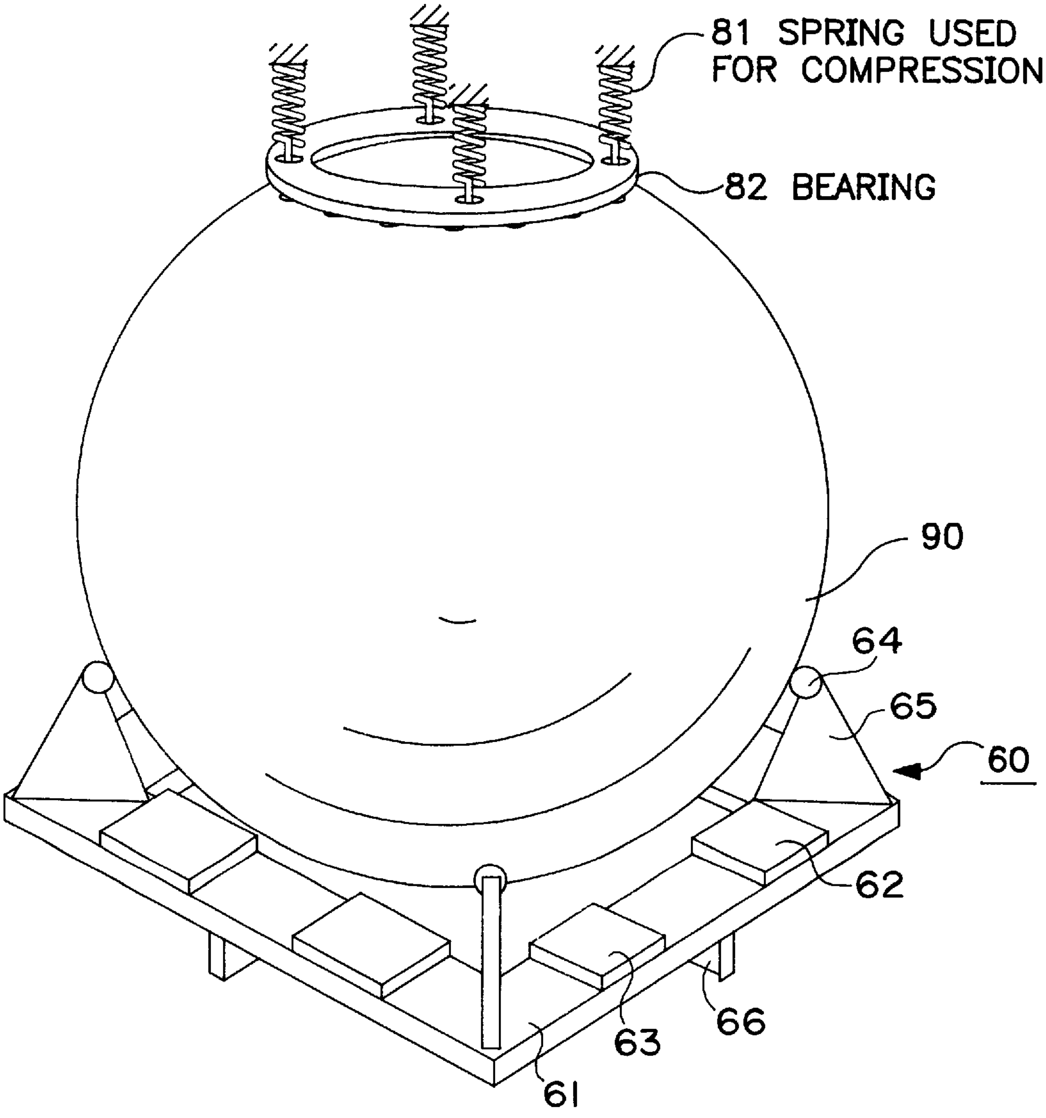
FIG. 5 is an oblique view of a multiple degrees of freedom vibration actuator type of drive device in accordance with a second embodiment of the present invention.
Figure 6:
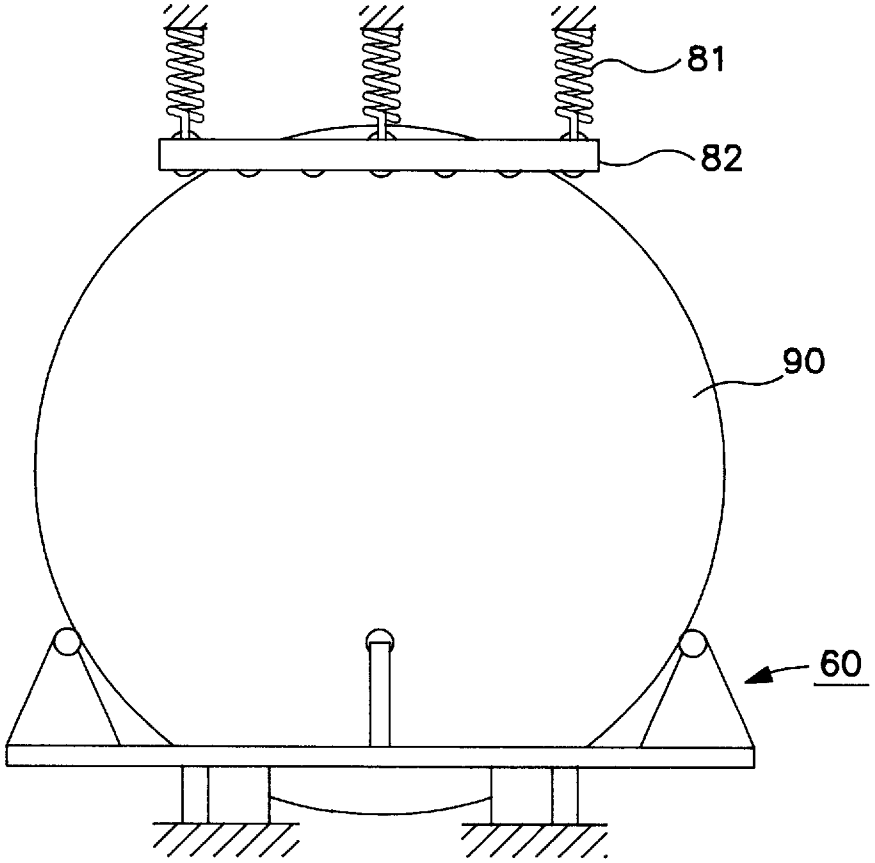
FIG. 6 is a side view of the multiple degrees of freedom vibration actuator type of drive device in accordance with the second embodiment of the present invention.
Figure 7:
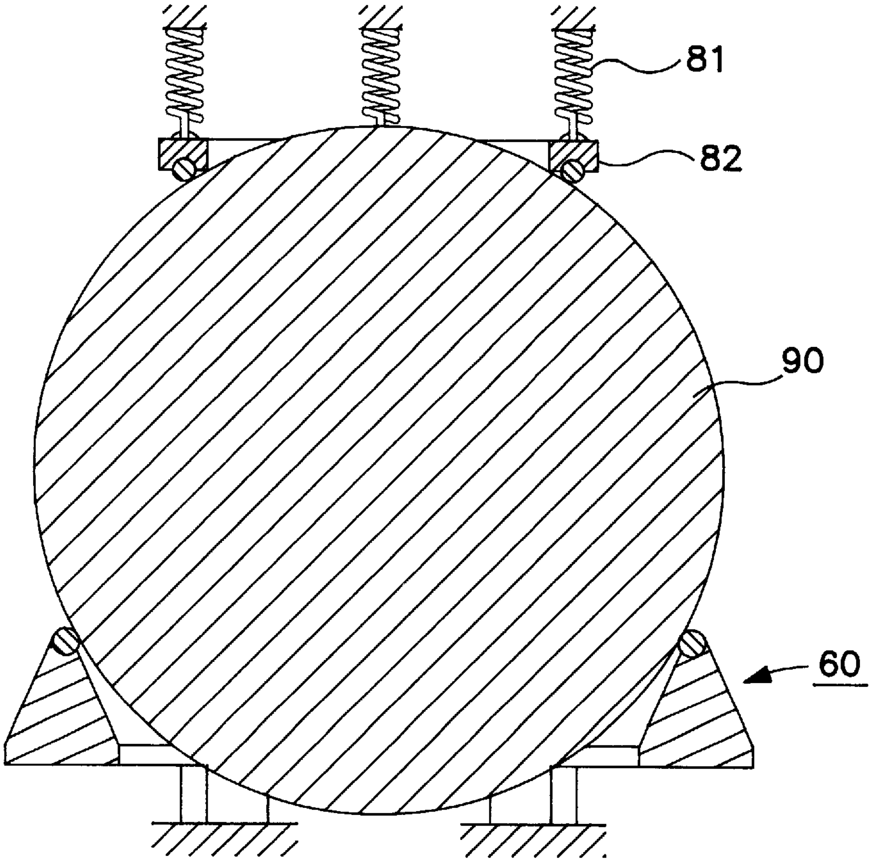
FIG. 7 is a cross sectional diagram of the multiple degrees of freedom vibration actuator type of drive device in accordance with the second embodiment of the present invention.

FIGS. 5, 6 and 7 are diagrams of a multiple degrees of freedom vibration actuator type of drive device in accordance with a second embodiment of the present invention. More specifically, FIG. 5 is an oblique view, FIG. 6 is a side view and FIG. 7 is a cross sectional view of the multiple degrees of freedom vibration actuator type of drive device in accordance with the second embodiment of the present invention.

In accordance with the second embodiment of the present invention described hereinbelow, the structures of the vibration element 60 and relative moving member 90 are the same as that shown in FIG. 1 and described with respect to the first embodiment of the invention. A duplicate description of these like elements is omitted.

In accordance with the second embodiment of the present invention, four compression members 81, which are preferably springs, are attached to a bearing 82 at one end and a fixed portion at the other end. The bearing 82 acts as a rotary support member disposed between the four compression members 81 and the relative moving member 90. The four compression members 81 and the bearing 82 provide a compressive force which causes the relative moving member 90 to suitably contact the vibration element 60 compressively.

In accordance with the second embodiment of the present invention, the combination of the four compression members 81 and the bearing 82 allow the relative moving member 90 to be compressed with the desired compressive force, without unduly restricting the rotation of the relative moving member 90.

Figure 8:
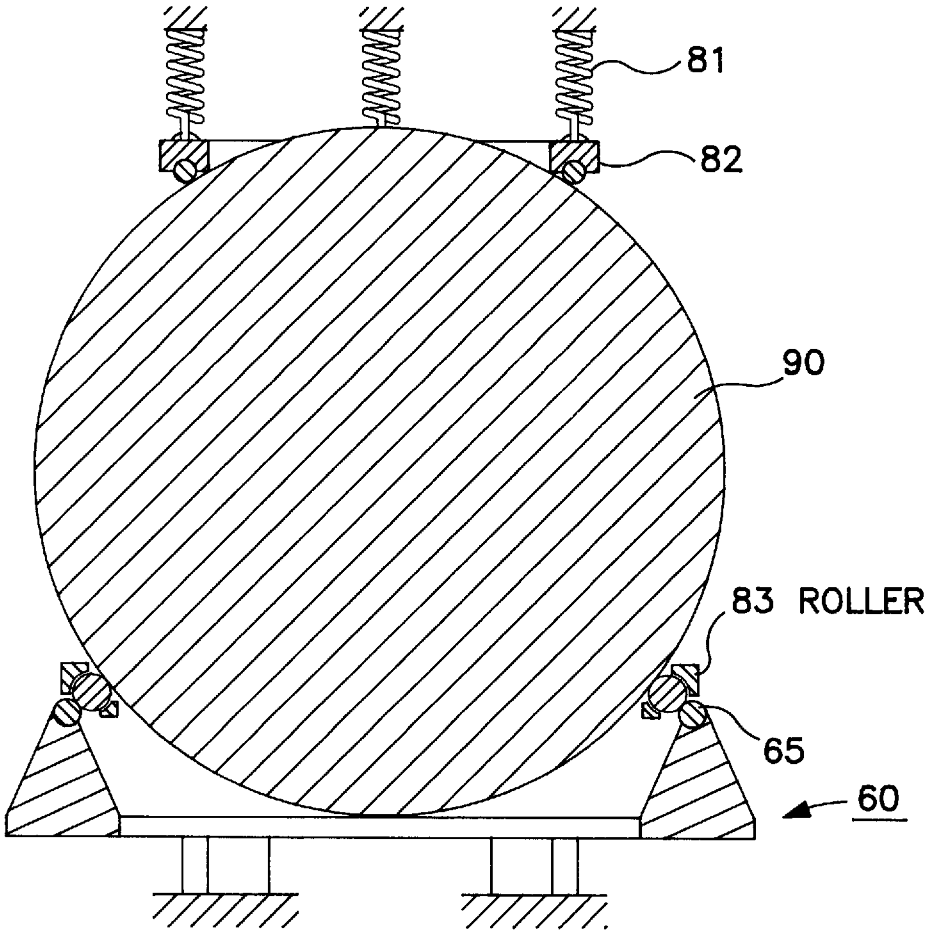
FIG. 8 is a cross sectional diagram of a multiple degrees of freedom vibration actuator type of drive device in accordance with a third embodiment of the present invention.

FIG. 8 is a cross sectional diagram of a multiple degrees of freedom type of drive device in accordance with a third embodiment of the present invention.

In accordance with the third embodiment of the present invention, four rotation transmission members 83, which are preferably roller bearings, are respectively disposed between the relative moving member 90 and the four driving force output members 65 of the vibration element 60. The four rotation transmission members 83 assist in maintaining uniform contact between the relative moving member 90 and the driving force output member 65. Furthermore, the four rotation transmission members 83 prevent unnecessary vibration from being transmitted which could damage the surface of the relative moving member 90.

More particularly, there are times when it is difficult for the four driving force output members 65 to simultaneously and uniformly contact the relative moving member 90. The four rotation transmission members 83 introduce play between the driving force output members 65 and the relative moving member 90, such that all four driving force output members simultaneously and uniformly contact the relative moving member 90.

It is noted that although embodiments of the present invention are described as having four driving force output members 65, the present Invention is not limited to four driving force output members. For example, three or five driving force output members 65 may be used.

Figure 9:
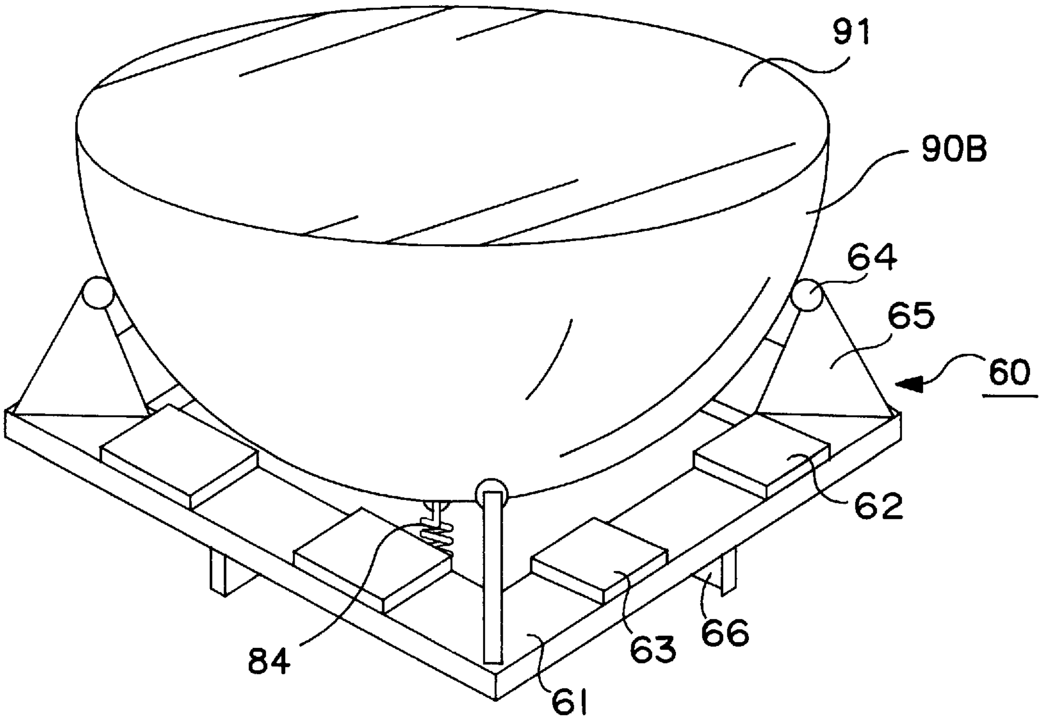
FIG. 9 is an oblique view of a multiple degrees of freedom vibration actuator type of drive device in accordance with a fourth embodiment of the present invention.
Figure 10:
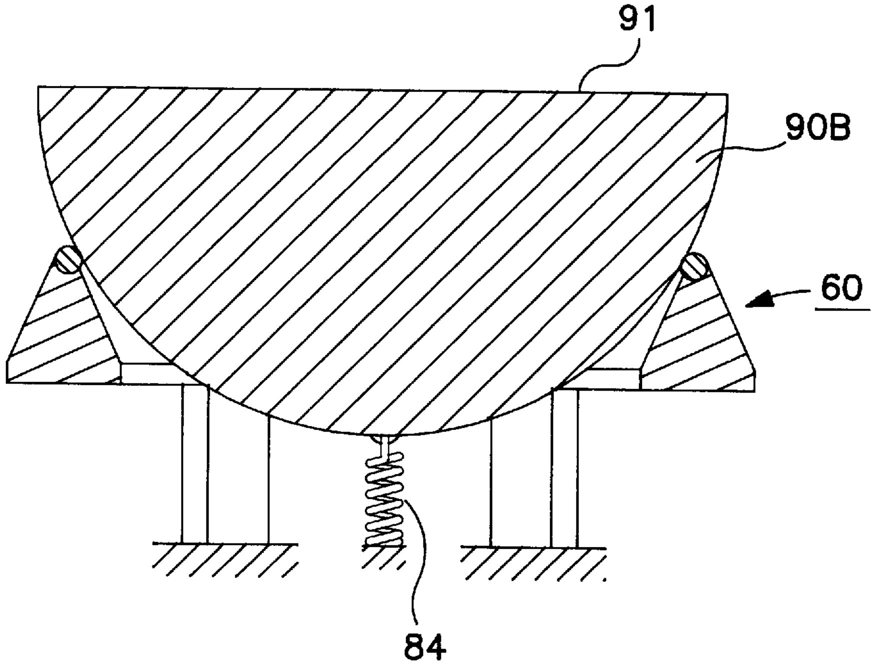
FIG. 10 is a cross sectional diagram of the multiple degrees of freedom vibration actuator type of drive device in accordance with the fourth embodiment of the present invention.

FIGS. 9 and 10 illustrate a multiple degrees of freedom vibration actuator type of drive device in accordance with a fourth embodiment of the present invention. More specifically, FIG. 9 is an oblique view, and FIG. 10 is a cross sectional view of the multiple degrees of freedom type of drive device in accordance with the fourth embodiment of the present invention. Like elements in the first through fourth embodiments are referred to by like reference numerals.

In accordance with the first through third embodiments of the present invention, a spherical or approximately spherical relative moving member 90 was described. However, in accordance with the fourth embodiment of the present invention, the relative moving member 90B has a hemispherical form having a flat surface portion 91. The flat surface portion 91 allows the relative moving member 90B to be used as a stage which freely rotates or tilts.

Moreover, in accordance with the second and third embodiments of the present invention, the compression members 81 press in a downward direction from above the relative moving member 90. In contrast, in accordance with the fourth embodiment of the present invention, a compression member 84, which is preferably a compression spring, is fixed to the relative moving member 90B and to a fixed portion at the underside of the relative moving member 90B. The compression member 84 pulls the relative moving member 90B downward such that the relative moving member 90B compressively contacts the driving force output members 65*a*–65*d*.

In accordance with the fourth embodiment of the present invention, the drive device as a whole is made smaller, and the upper portion of the relative moving member 90B can be designed for efficient use. Further, by mounting a mirror or the like on the flat surface portion of the relative moving member 90B, it is possible to use the multiple degrees of freedom type of drive device, for example, as a device which modifies a light path in an optical device, or similar device.

Figure 11:
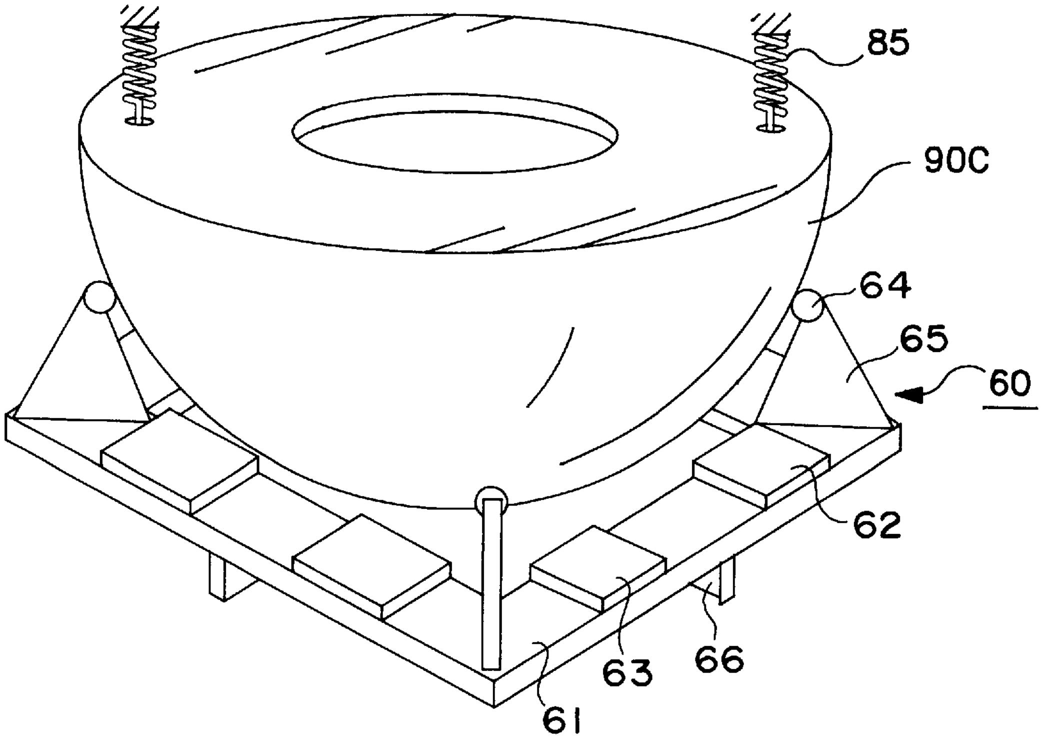
FIG. 11 is an oblique view of a multiple degrees of freedom vibration actuator type of drive device in accordance with a fifth embodiment of the present invention.

FIGS. 11 and 12 show a multiple degrees of freedom vibration actuator type of drive device in accordance with a fifth embodiment of the present invention. FIG. 11 is an oblique view, and FIG. 12 is a cross sectional view of the multiple degrees of freedom vibration actuator type of drive device in accordance with the fifth embodiment of the present invention. Like elements in the first through fifth embodiments are referred to by like reference elements, and a detailed description of these like elements is omitted.

In accordance with the fifth embodiment of the present invention, a hemispherical relative moving member 90C is provided having a hollow central portion, and an optical element 92, or the like, is assembled into the hollow interior of the relative moving member 90C. In accordance with the fifth embodiment of the present invention, it is possible to use the multiple degrees of freedom vibration actuator type of drive device, for example, in an optical axis correction device or the like for compensating for blurring motion of a camera.

Moreover, in accordance with the fifth embodiment of the present invention, the optical element 92 is an example of a built-in optical element. However, for example, the multiple degrees of freedom vibration actuator type of drive device in accordance with the fifth embodiment of the present invention can also be applied to devices in which directional adjustability is required, such as miniature cameras, antennas and light generating devices.

Figure 13:
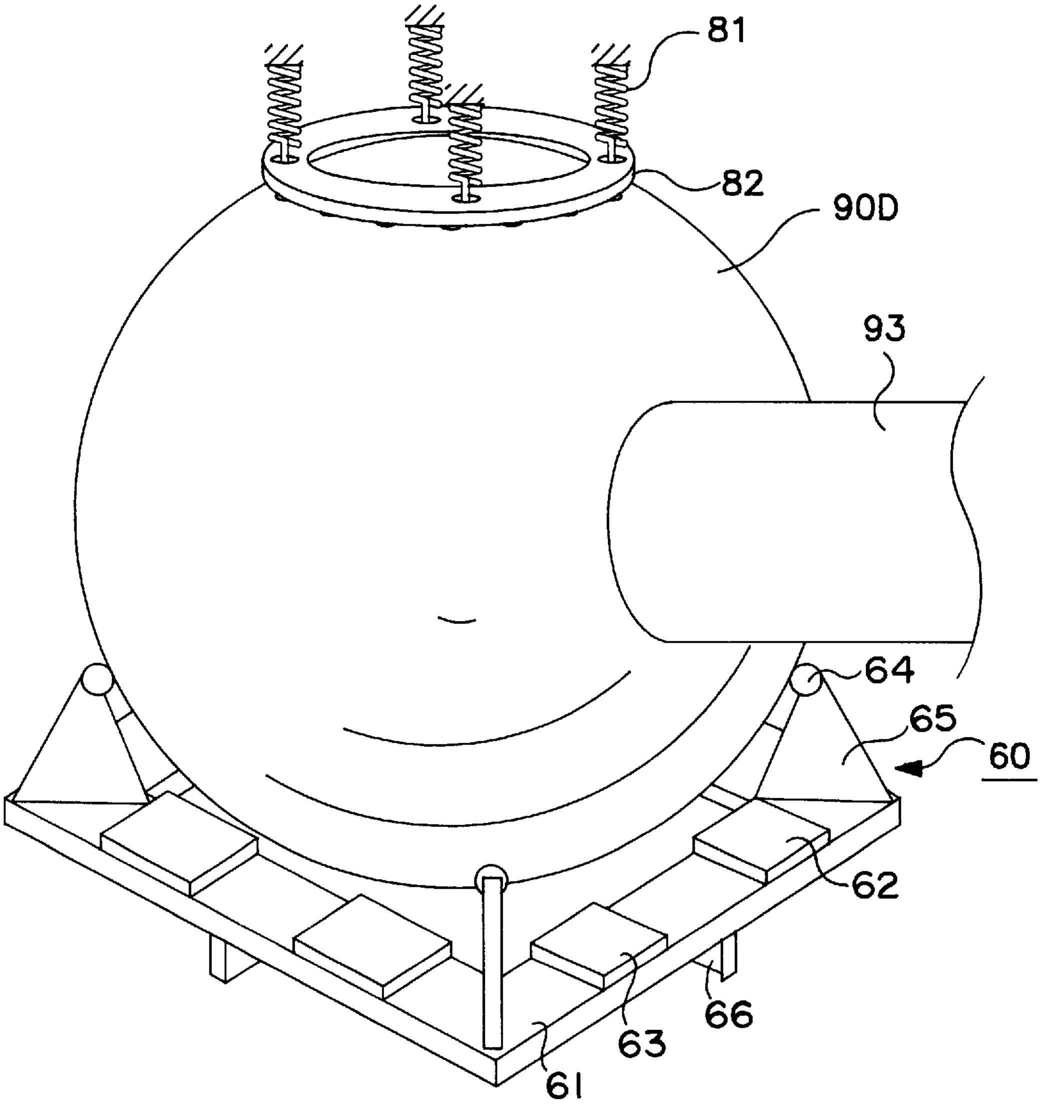
FIG. 13 is an oblique view of a multiple degrees of freedom vibration actuator type of drive device in accordance with a sixth embodiment of the present invention.

FIG. 13 is an oblique view of a multiple degrees of freedom vibration actuator type of drive device in accordance with a sixth embodiment of the present invention. Like elements in the first through sixth embodiments are referred to by like reference numerals, and a detailed description of these like elements is omitted.

In accordance with the sixth embodiment of the present invention, a rod-shaped output takeoff member 93 is joined and fixed to a portion of a relative moving member 90D. The drive device in accordance with the sixth embodiment can be applied to devices for which there is a present strong demand for miniaturization, such as joints of the hand (particularly the wrist shaft) or elbow of an industrial robot. For example, the vibration actuator in accordance with the sixth embodiment of the present invention could perform the same function as an electric motor six (6) axis type robot.

Figure 14A:
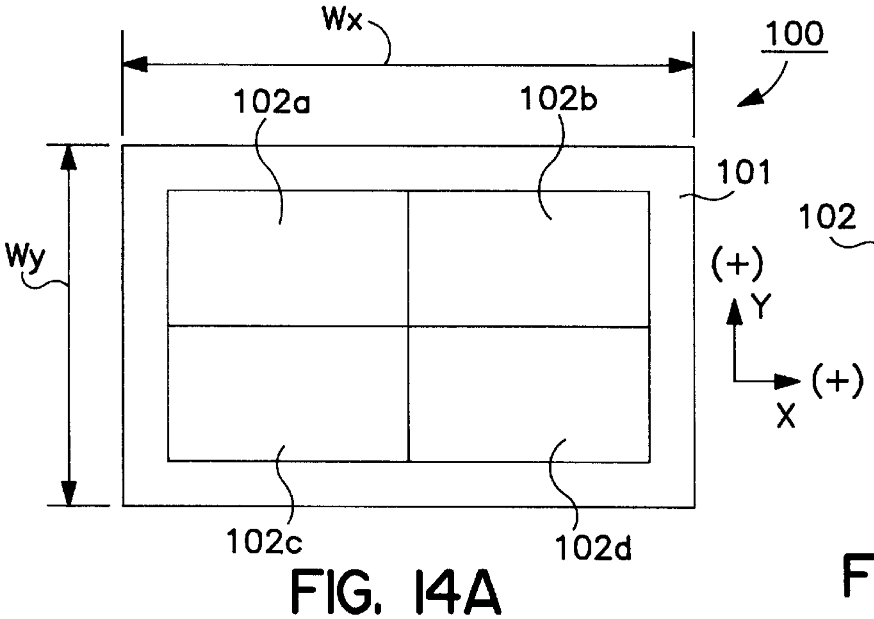
FIG. 14A is a plan view of the body of a multiple degrees of freedom vibration actuator type of drive device in accordance with a seventh embodiment of the present invention.
Figure 14B:
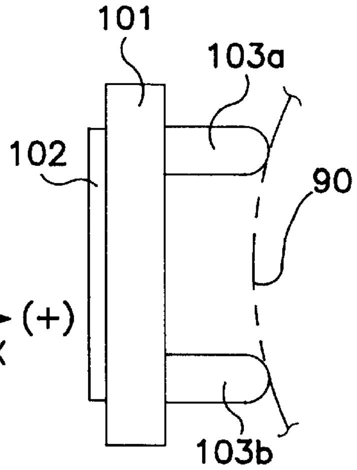
FIG. 14B is a side view of the body of the multiple degrees of freedom vibration actuator type of drive device in accordance with the seventh embodiment of the present invention.
Figure 14C:
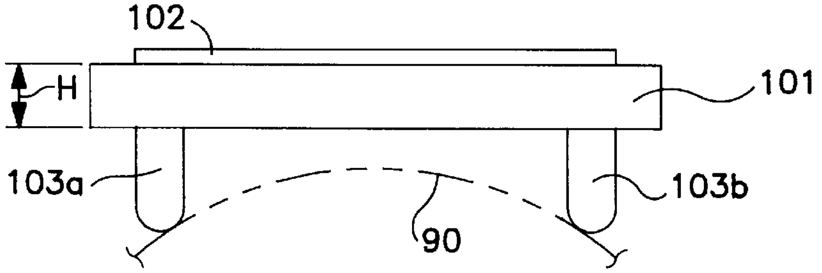
FIG. 14C is a front view of the body of the multiple degrees of freedom vibration actuator type of drive device in accordance with the seventh embodiment of the present invention.
Figure 14D:
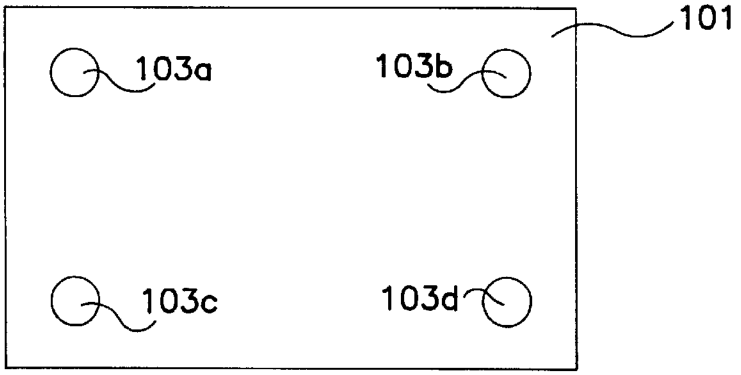
FIG. 14D is a bottom view of the body of the multiple degrees of freedom vibration actuator type of drive device in accordance with the seventh embodiment of the present invention.

FIGS. 14A–14C are views of a multiple degrees of freedom vibration actuator type of drive device in accordance with a seventh embodiment of the present invention. More specifically, FIG, 14A is a plan view, FIG. 14B is a side view, FIG. 14C is a front view, and FIG. 14D is a bottom surface view of the multiple degrees of freedom vibration actuator type of drive device in accordance with the seventh embodiment of the present invention.

The vibration actuator in accordance with the seventh embodiment of the present invention comprises a vibration element 100 including an elastic member 101, electromechanical converting elements 102_a_–102_d,_ driving force output members 103_a_–103_d,_ and a relative moving member 90 which is in contact with the vibration element 100 via the driving force output members 103_a_–103_d._

Elastic member 101 has a rectangular flat form shape and comprises metallic materials, such as stainless steel or aluminum alloy, plastic materials or the like elastic materials. In accordance with the seventh embodiment of the present invention, the elastic member 101 has a thickness H, a length Wx and a width Wy.

The four rectangular electromechanical converting elements 102_a_–102_d_ are adhesively mounted to a front surface of the elastic member 101, and the four driving force output members 103_a_–103_d_ are mounted on a rear surface of the elastic member 101. The driving force output members 103_a_–103_d_ contact the relative moving member 90, and are arranged at positions on the rear surface of elastic member 101 which transmit drive force from the elastic member 101. The driving force output members 103_a_–103_d_ preferably comprise plastic materials containing tetrafluoroethylene resin in their tip portions (for example, Teflon, trademark of Dupont Company) or molybdenum disulfide, and the like low friction materials which have low or reduced resistance to sliding. The electromechanical converting elements 102_a_–102_d_ convert electrical energy into mechanical displacements. For example, the electromechanical converting elements 102_a_–102_d_ may be PZT and the like piezoelectric elements or PMN and the like electrostrictive elements.

In operation of the vibration actuator shown in FIGS. 14A–14D, when an alternating voltage is impressed on the electromechanical converting elements 102_a_–102_d,_ elliptical motion is generated in the elastic member 101 at the locations where the driving force output members 103_a_–103_d_ are mounted. The driving force output members 103_a_–103_d_ are placed in compressive contact with the relative moving member 90 by a compression member (not shown in the figure), and generate a relative motion with respect to the relative moving member 90.

Figure 15:
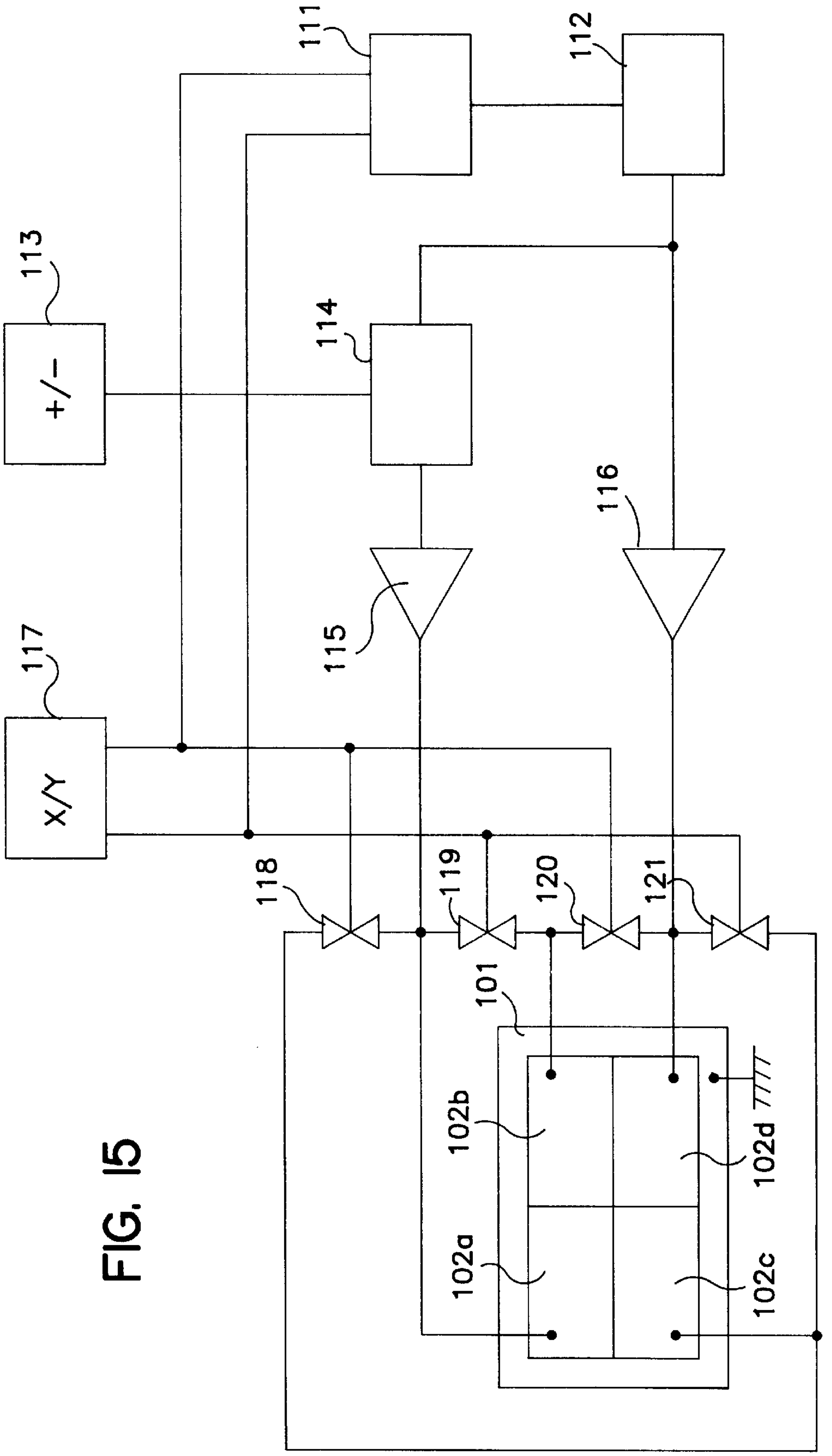
FIG. 15 is a block diagram of a drive circuit for the multiple degrees of freedom vibration actuator type of drive device in accordance with the seventh embodiment of the present invention.

FIG. 15 is a block diagram of drive device for the multiple degrees of freedom type vibration actuator in accordance with the seventh embodiment of the present invention.

As shown in FIG. 15, the drive device includes an input frequency instruction unit 111, an oscillator 112, a phase instruction unit 113, a phase shifter 114, amplifiers 115 and 116, an X-Y direction instruction unit 117, and analog switches 118–121.

In operation of the vibration actuator and drive device, when it is desired to rotate the relative moving member 90 in a clockwise direction around the Y-axis (i.e., relatively moving the vibration actuator in the +X-direction), firstly, X is set by the X-Y direction instruction unit 11 7, thereby setting ON the analog switches 118, 120, and setting OFF the analog switches 119, 121, By changing the setting of the analog switches 118–121, the electromechanical converting elements 102_a_ and 102_c_ and the electromechanical converting elements 102_b_ and 102_d_ can be integrally respectively grouped.

Next, (+) is set by the phase instruction unit 113, and a phase shift of $\pi/2$ is performed by the phase shifter 114. With the phase instruction unit 113 set to (+), when a drive in the X-direction is instructed from the X-Y direction instruction unit 117 to the input frequency instruction unit 111, the input frequency instruction unit 111 instructs the oscillator 112 to output a first frequency signal.

The first frequency signal output from the oscillator 112 is amplified by the amplifier 116 and input to the electromechanical converting elements 102_b_ and 102_d._ Further, the first frequency signal output from the oscillator 112 is also phase shifted by $+\pi/2$ by the phase shifter 114, then amplified by the amplifier 115 and input to the electromechanical converting elements 102_a_ and 102_c._

A first order longitudinal vibration and a sixth order bending vibration arise in the elastic member 101 when the voltage frequencies, as described above, are impressed on the electromechanical converting elements 102_a_–102_d._ The degeneracy of the first order longitudinal and sixth order bending vibration causes elliptical motion to be generated at the positions of the elastic member 101 where the driving force output members 103_a_–103_d_ are affixed. In the above-described manner, relative motion is generated in the +X-direction with respect to the relative moving member 90, and a clockwise rotation around the Y-axis is conferred on the relative moving member 90.

Moreover, when it is desired to rotate the relative moving member 90 in a counterclockwise direction around the Y-axis (i.e., relatively moving the vibration actuator in the −X direction), firstly, X is set by the X-Y direction instruction unit 117, thereby setting ON the analog switches 118 and 120, and setting the OFF analog switches 119 and 121. By setting switches 118 and 120 ON and switches 119 and 121 OFF, the electromechanical converting elements 102_a_ and 102_c_ and the electromechanical converting elements 102_b_ and 102_d_ can be integrally respectively grouped.

Next, (—) is set by the phase instruction unit 113, and a phase shift of $-\pi/2$ is performed by the phase shifter 114. With the phase instruction unit 113 set to (—), when a drive in the X-direction is instructed from the X-Y direction instruction unit 117 to the input frequency instruction unit 111, the input frequency instruction unit 111 instructs the oscillator 112 to output a first frequency signal.

The first frequency signal output from the oscillator 112 is amplified by the amplifier 116 and input to the electromechanical converting elements 102_b,_ 102_d._ Further, the first frequency signal is phase shifted by $-\pi/2$ by the phase shifter 114, then amplified by the amplifier 115 and input to the electromechanical converting elements 102_a,_ 102_c._

A first order longitudinal vibration and a sixth order bending vibration arise in the elastic member 101 when voltage frequencies, as described above, are impressed on the electromechanical converting elements 102_a_–102_d_. The degeneracy of the first order longitudinal vibration and sixth order bending vibration causes elliptical motion to be generated at the positions of the elastic member 101 where the driving force output members 103_a_–103_d_ are affixed. In the above-described manner, relative motion is generated in the —X-direction with respect to the relative moving member 90, and a counterclockwise rotation around the Y-axis is conferred on the relative moving member 90.

Furthermore, when it is desired to rotate the relative moving member 90 in a clockwise direction around the X-axis, (i.e., relatively moving the vibration actuator in the +Y-direction), firstly, Y is set by the X-Y direction instruction unit 117, thereby setting ON the analog switches 119 and 121, and setting OFF the analog switches 118 and 120. By setting the analog switches 118–120 in the above manner, the electromechanical converting elements 102_a,_ 102_b_ and the electromechanical converting elements 102_c,_ 102_d_ can be integrally respectively grouped.

Next, (+) is set by the phase instruction unit 113, and a phase shift of +π/2 is performed by the phase shifter 114. With the phase instruction unit 113 set to (+), when a drive in the Y-direction is instructed from the X-Y direction instruction unit 117 to the input frequency instruction unit 111, the input frequency instruction unit 111 instructs the oscillator 112 to output a second frequency signal.

The second frequency signal output from the oscillator 112 is amplified by the amplifier 116 and input to the electromechanical converting elements 102_c,_ 102_d_. Further, the second frequency signal is phase shifted by +π/2 by the phase shifter 114, then amplified by the amplifier 115 and input to the electromechanical converting elements 102_a,_ 102_b_.

By impressing voltages on the electromechanical converting elements 102_a_–102_d_ in the above-described manner, a first order longitudinal vibration and a fourth order bending vibration arise in the elastic member 101. The degeneracy of the first order longitudinal vibration and fourth order bending vibration causes elliptical motion to be generated at the positions of the elastic member 101 where the driving force output members 103_a_–103_d_ are affixed. In the above-described manner, relative motion is generated in the +Y-direction with respect to the relative moving member 90, and a clockwise rotation around the X-axis is conferred on the relative moving member 90.

Finally, when it is desired to rotate the relative moving member 90 in a counterclockwise direction around the X-axis (i.e., relatively moving the vibration actuator in the —Y-direction), firstly, Y is set by the X-Y direction instruction unit 117, thereby setting ON the analog switches 119 and 121, and setting OFF the analog switches 118 and 120. By setting the analog switches 118–120 in the above manner, the electromechanical converting elements 102_a,_ 102_b_ and the electromechanical converting elements 102_c,_ 102_d_ can be integrally respectively grouped.

Next, (—) is set by the phase instruction unit 113, and a phase shift of —π/2 is performed by the phase shifter 114. With the phase instruction unit 113 set to (—), when a drive in the Y-direction is instructed from the X-Y direction instruction unit 117 to the input frequency instruction unit 111, the input frequency instruction unit 111 instructs the oscillator 112 to output a second frequency signal.

The second frequency signal output from the oscillator 112 is amplified by the amplifier 116 and input to the electromechanical converting elements 102_c,_ 102_d_. Further, the second frequency signal is phase shifted by —π/2 by the phase shifter 114, then amplified by the amplifier 115 and input to the electromechanical converting elements 102_a,_ 102_b_.

By impressing voltages on the electromechanical converting elements 102_a_–102_d_ in the above-described manner, a first order longitudinal vibration and a fourth order bending vibration arise in the elastic member 101. The degeneracy of the first order longitudinal vibration and fourth order bending vibration causes elliptical motion to be generated at the positions of the elastic member 101 where the driving force output members 103_a_–103_d_ are affixed. In the above-described manner, relative motion is generated in the —Y-direction with respect to the relative moving member 90, and a counterclockwise rotation around the X-axis is conferred on the relative moving member 90.

Figure 16:
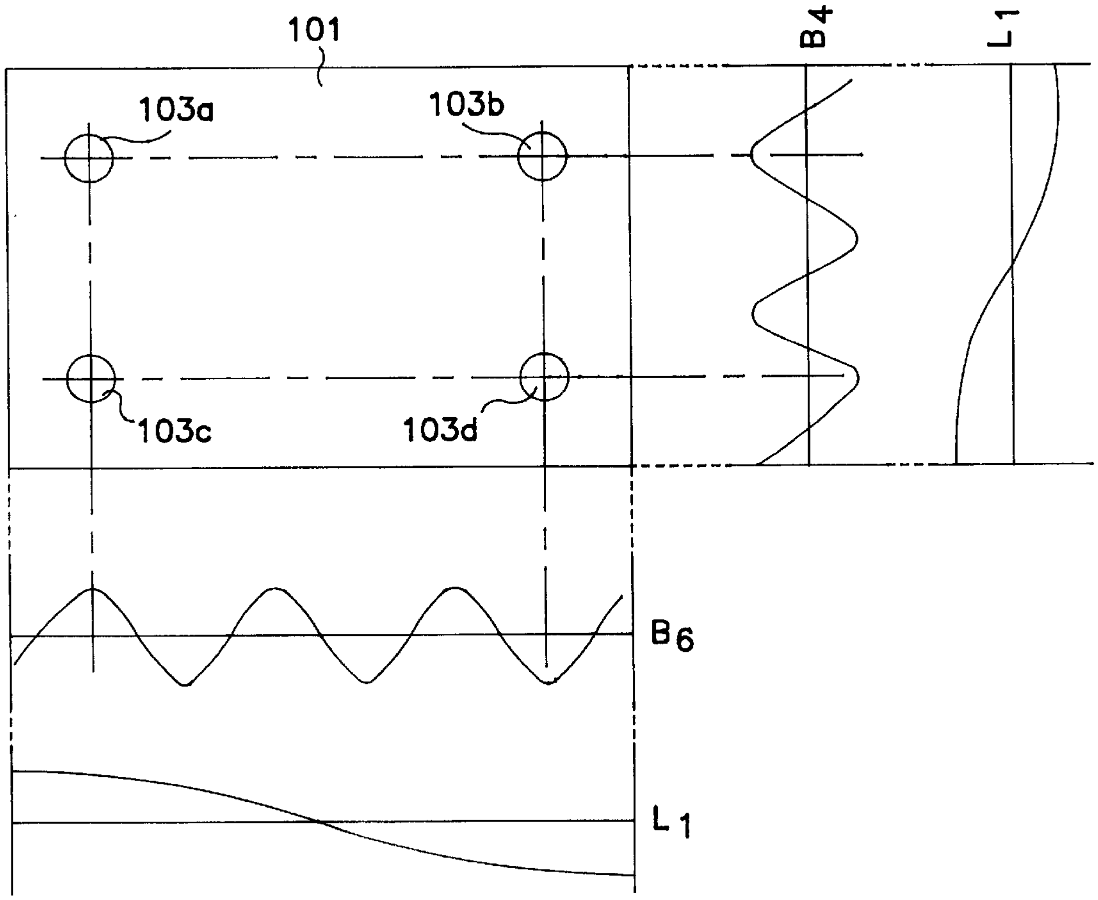
FIG. 16 comprises illustrative diagrams showing the principles of respectively driving an ultrasonic actuator in the X-direction and Y-direction, used in the multiple degrees of freedom type of drive device in accordance with the seventh embodiment of the present invention.

FIG. 16 is a diagram showing the principles of respectively driving the vibration actuator in the X-direction and the Y-direction in accordance with the seventh embodiment of the present invention.

In the equations below, E is the longitudinal elastic modulus of the elastic member 101, ρ is the density of the elastic member 101, l is the cross sectional second moment of the elastic member 101, and A is the cross sectional area of the elastic member 101.

Setting the length Wx of the elastic member 101 as $$Wx=32\cdot\pi\cdot H/(12)^{1/2},$$

then the resonant frequency Ω L1X of the first order longitudinal vibration is given by $$\begin{aligned}\Omega L1X &= [\pi\cdot(E/\rho)^{1/2}]/(2\cdot Wx)\\ &= [(12\cdot E/\rho)^{1/2}]/(64\cdot H).\end{aligned}$$

Moreover, the resonant frequency of the sixth order bending vibration Ω B6X, becomes $$\begin{aligned}\Omega B6X &= [16\cdot\pi\cdot\pi\cdot(E\cdot I/\rho\cdot A)^{1/2}]/(Wx\cdot Wx)\\ &= [(12\cdot E/\rho)^{1/2}]/(64\cdot H).\end{aligned}$$

It can be seen that the first order longitudinal vibration and the sixth order bending vibration coincide and are degenerate.

Accordingly, by inputting a frequency of $[(12\text{-}E/\rho)^{1/2}]/(64\text{-}H)$, the vibration actuator is driven in the X-direction (the direction from left to right in FIG. 16).

Next, setting the width Wy of the elastic member 101 as $$Wy=72\cdot\pi\cdot H/(12)^{1/2},$$

the resonant frequency of the first order longitudinal vibration Ω L1Y, becomes $$\begin{aligned}\Omega L1Y &= [\pi\cdot(E/\rho)^{1/2}]/(2\cdot Wy)\\ &= [(12\cdot E/\rho)^{1/2}]/(144/H).\end{aligned}$$

Moreover, the resonant frequency of the fourth order bending vibration Ω B6X, becomes $$\Omega B4Y = [16 \cdot \pi \cdot \pi \cdot (E \cdot I/\rho \cdot A)^{1/2}]/(Wy \cdot Wy) = [(12 \cdot E/\rho)^{1/2}]/(144 \cdot H).$$

It can be seen that the first order longitudinal vibration and the fourth order bending vibration coincide and are degenerate.

Accordingly, by inputting a frequency of $[(12\text{-}E/\rho)^{1/2}]/(144 \cdot H)$, the ultrasonic actuator is driven in the Y-direction (the up and down direction in FIG. 16).

Because the input frequency $[(12 \cdot E/\rho)^{1/2}]/(64 \cdot H)$ for driving in the X-direction and the input frequency $[(12 \cdot E/\rho)^{1/2}]/(144 \cdot H)$ for driving in the Y-direction are different, it becomes possible to select driving in the X-direction and driving in the Y-direction.

Moreover, the effects may be found which the resonant frequency confers on the electromechanical converting elements 102*a*–102*d* and the driving force output members 103*a*–103*d*.

In accordance with the seventh embodiment of the present invention, as shown in FIG, 16, the positions of the antinodes of the fourth order bending vibration B4, intersect with the positions of the antinodes of the sixth order bending vibration B6, and are arranged such that the output portions of the relative motion in the Y-direction and the output portions of the relative motion in the X-direction resonate.

Figures 17A, 17B:
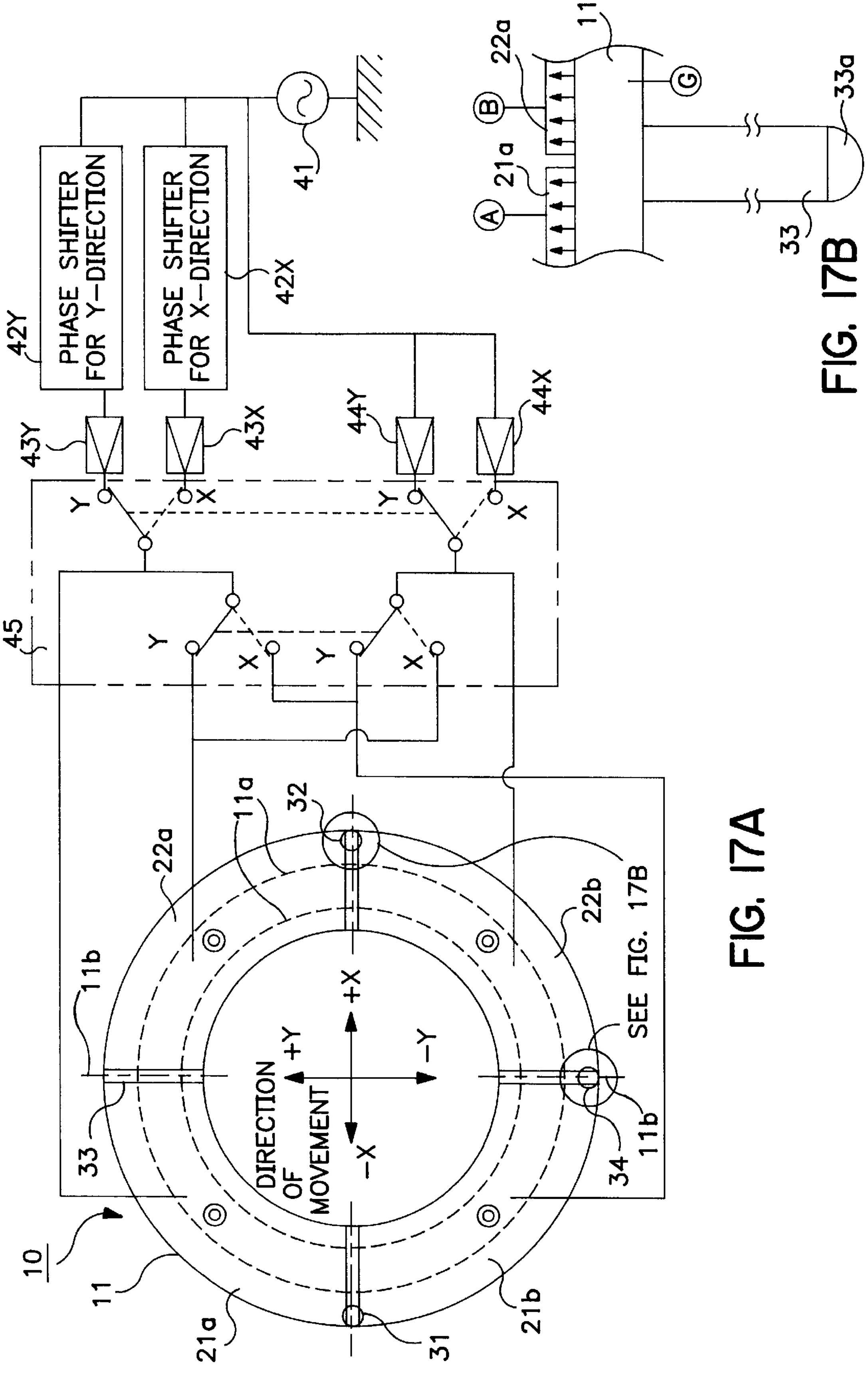
FIG. 17A is a schematic diagram of a multiple degrees of freedom vibration actuator type of drive device in accordance with an eighth embodiment of the present invention.
FIG. 17B is a schematic diagram of a driving force output member of the vibration actuator in accordance with the eighth embodiment of the present invention.
Figure 18:
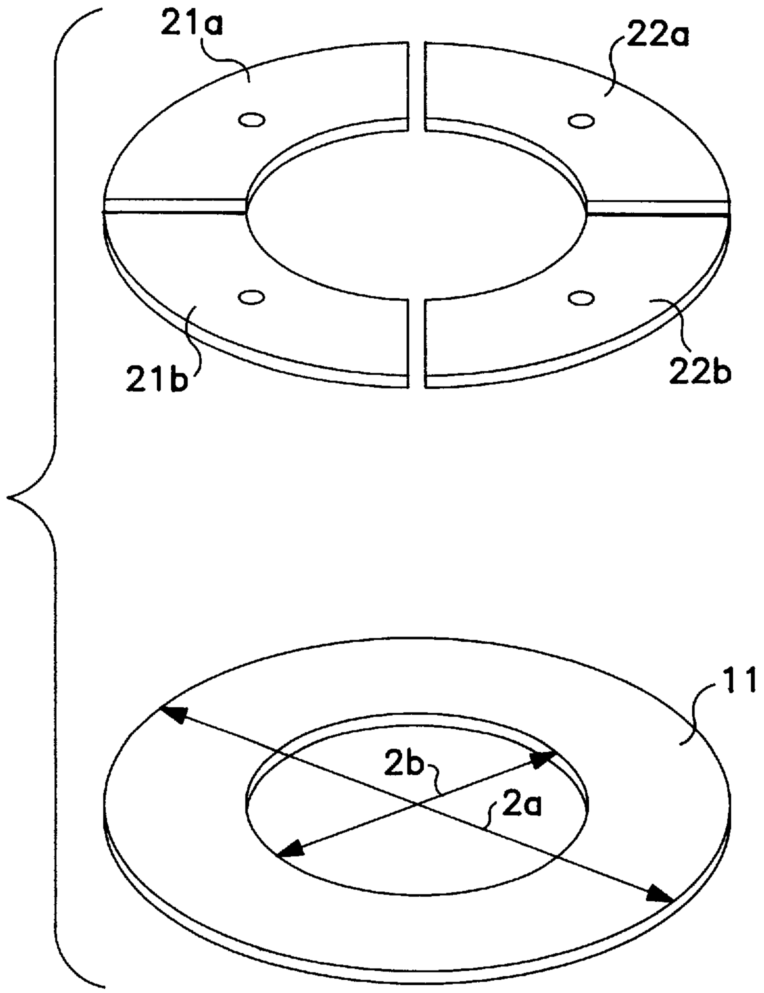
FIG. 18 is an oblique view of an elastic member and piezoelectric element of the vibration actuator in accordance with the eighth embodiment of the present invention.
Figure 19:
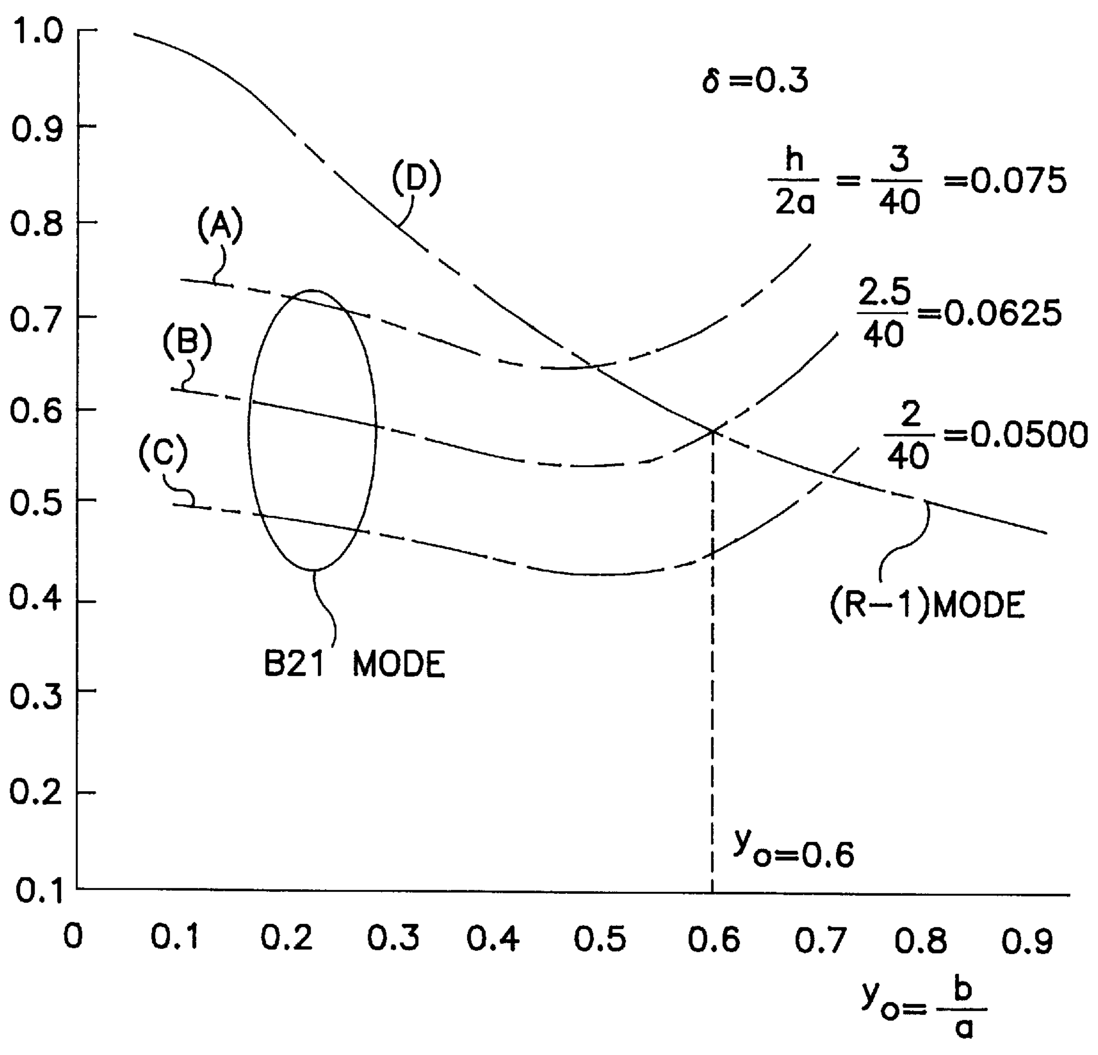
FIG. 19 is a graph illustrating the nodes of vibration for the elastic member of the vibration actuator in accordance with the eighth embodiment of the present invention.

FIGS. 17A–17B illustrate a drive device for a multiple degrees of freedom type vibration actuator in accordance with an eighth embodiment of the present invention. FIG. 18 is an oblique view of an elastic member and piezoelectric element, formed as an annulus, in accordance with the eighth embodiment of the present invention. FIG. 19 is a graph illustrating the modes of vibration for the elastic member in accordance with the eighth embodiment of the present invention. FIGS. 20A–20D are diagrams illustrating the driving force output members in accordance with the eighth embodiment of the present invention. FIGS, 21A–21D are graphs illustrating the operation of the vibration actuator in accordance with the eighth embodiment of the present invention.

In accordance with the eighth embodiment of the present invention, the vibration actuator comprises an elastic member 11 which generates a (R-1)-B21 mode of vibration, in which a first vibration is generated in a surface of the annular elastic member 11 which is parallel to a standard surface, and an m-th nodal circle vibrates in a direction which intersects the direction of vibration of the first vibration, as an elastic member generating the combined vibration of the second vibration, which is a bending vibration of the n-th nodal diameter. Moreover, the symbols m and n denote integers.

As shown in FIG. 17A, a vibration element 10 comprises an elastic member 11, having four piezoelectric elements 21*a,* 21*b,* 22*a,* 22*b* bonded, for example, by adhesion, on the upper surface of the elastic member 11. The elastic member includes four driving force output members 31, 32, 33, 34 formed as projections on the lower surface of the elastic member 11.

As shown in FIG. 18, which is an oblique view of the elastic member 11 and piezoelectric elements 21*a,* 21*b,* 22*a,* 22*b,* in accordance with the fourth embodiment of the present invention, the elastic member 11 is an annular form, and is made of metal, plastic material or the like. Further, the piezoelectric elements 21*a,* 21*b,* 22*a,* 22*b* have a shape which corresponds to the annular elastic member 11.

FIG. 19 is a graph illustrating the modes of vibration of the elastic member 11 in accordance with the eighth embodiment of the present invention. The abscissa of the graph in FIG. 19 represents the ratio y=b/a of the external diameter 2*a* and the internal diameter 2*b* of the annular elastic member 11. The hole in the annular elastic member 11 is not open at the position y=0, and, as y approaches y=1, the hole becomes larger. Moreover, the ordinate of the graph in FIG. 19 represents the ratio of the resonant frequency ω21 of the B21 mode to the resonant frequency ω00 of the (R - 1) mode, specifically, $\omega 21/\omega 00=\{\alpha\ 21^2/[2.05 \cdot (3)^{1/2}]\} \cdot (h/2a)$.

As shown in FIG. 19, by suitably setting the dimensions of the annulus of the elastic member 11, a longitudinal vibration ((R-1) mode: expansion and contraction vibration in the surface direction) which is the first vibration, and a bending vibration (B21 mode) which is the second vibration, can be made to coincide, In accordance with the eighth embodiment of the present invention, the longitudinal vibration and bending vibration are made to coincide is by adjusting the inside aperture diameter 2*b* of the elastic member 11.

As shown in FIG. 19, the curve (A) illustrates the (R - 1) mode, and the curves (B), (C) and (D) illustrate the B21 mode. The curves (A), (B), (C) and (D) are obtained by varying a value of a ratio of the plate thickness h of the disc shaped elastic member 11 to the external diameter 2a of the annulus of the elastic member 11 to 3/40, 2.5/40 and 2/40.

As shown in FIG. 19, when the plate thickness h=2.5 mm and an external diameter 2a=40 mm, it can be seen that degeneracy of the longitudinal vibration and the bending vibration is possible, close to y=0.6.

Figure 20A:
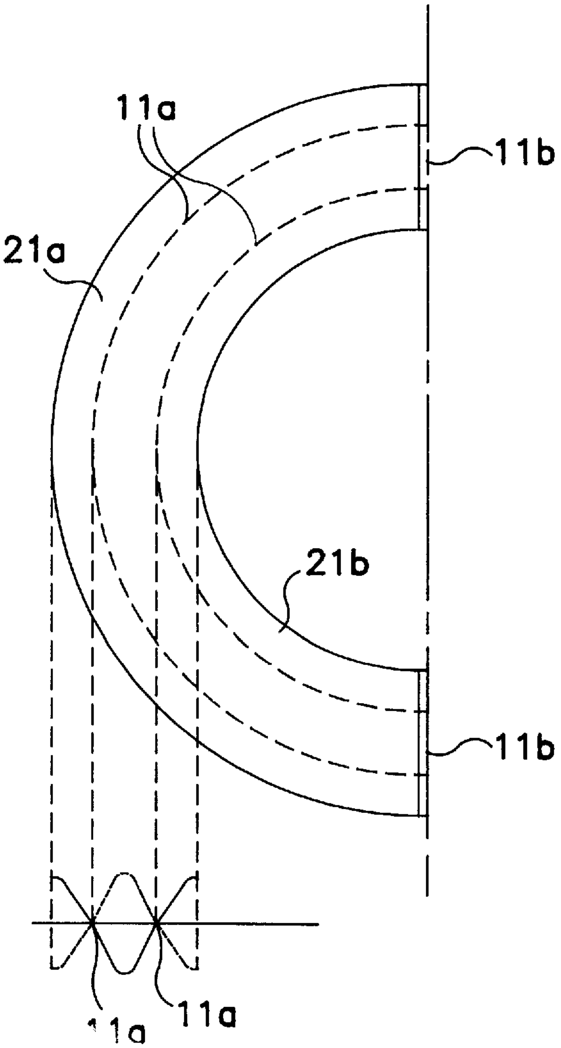
FIGS. 20A–20D are diagrams illustrating the positioning of a driving force output member of the vibration actuator in accordance with the eighth embodiment of the present invention.

In accordance with the eighth embodiment of the present invention, the vibration actuator has been described using the example of causing degeneracy of the (R - 1) mode (first vibration) and the B21 mode (second vibration). FIG. 17A or FIG. 20A illustrate the nodal circles 11*a* and nodal diameters 11*b* of the (R - 1) - B21 mode.

As shown in FIG. 18, the piezoelectric elements 21*a,* 21*b,* 22*a,* 22*b,* respectively, exhibit four quadrants, and are made of PZT or the like. As shown in FIG. 17B, the piezoelectric elements 21*a,* 21*b,* 22*a,* 22*b* are polarized in the thickness direction, and two input voltages A, B are respectively impressed.

The driving force output members 31–34 are formed as projections on a flat surface of the elastic member 11 opposite the surface on which the piezoelectric elements 21*a,* 21*b,* 22*a,* 22*b* are formed. The driving force output members 31–34 transmit elliptical motion which is generated by the combined bending vibration and stretching vibration of the elastic member 11. Further, the driving force output members 31–34, while in contact with the relative moving member 90, cause relative motion of the relative moving member 90.

As shown in FIG. 17A, the driving force output members 31–34 are arranged at four positions 90° apart around the outer edge portion of the lower surface of the elastic member 11. As shown in FIG. 17B, to increase wear resistance of the driving force output members 31–34, hemispherical bodies 33*a* of silicon nitride, or the like, are mounted at the tips of the driving force output members 31–34.

Figure 20B:
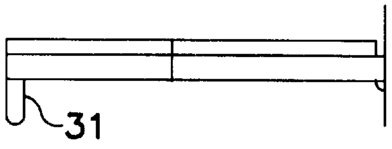
Figure 20C:
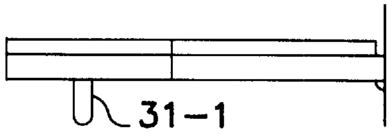
Figure 20D:
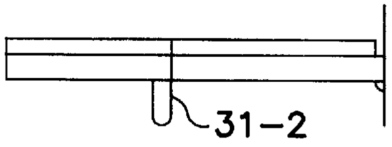

The driving force output member 31–34 are preferably disposed at positions which avoid the nodes of the longitudinal vibration in order to efficiently transmit drive force. In accordance with the eighth embodiment of the present invention, as shown in FIGS. 20B, 20C and 20D, the driving force output members 31–34, as exemplified by driving force output member 31, are arranged at the positions of the antinodes 31, 31-1 or 31-2 of the bending vibration in an approximately perpendicular direction with respect to the plane of movement.

As shown in FIG. 17B, by impressing high frequency voltages A, B on the four piezoelectric elements 21*a,* 21*b,* 22*a,* 22*b,* combined bending vibration and longitudinal vibration are generated in the elastic member 11 of the vibration element 10. An elliptical motion is thereby generated at the tips of the driving force output members 31–34 causing a drive force to be generated. In FIG, 17B, the symbol G denotes ground. Moreover, the four piezoelectric elements 21*a,* 21*b,* 22*a,* 22*b* are polarized so that their polarizes are mutually in the same direction. However, the direction of polarization of the four piezoelectric elements 21*a,* 21*b,* 22*a,* 22*b* may be mutually opposite directions. Furthermore, the high frequency voltages A, B have a time phase difference of π/2.

In operation of the drive circuit for the multiple degrees of freedom vibration actuator shown in FIG. 17A, an oscillator 41 generates a high frequency signal. The high frequency signal output from the oscillator 41 is input to an X-direction amplifier 43X and a Y-direction amplifier 43Y after being phase shifted in time by π/2 by an X-direction phase shifter 42X and a Y-direction phase shifter 42Y, respectively. Further, the high frequency signal from the oscillator 41 is directly input to an X-direction amplifier 44X and a Y-direction amplifier 44Y.

Each amplifier 43X, 43Y, 44X, 44Y is respectively connected, via a changeover switch 45, to respective electrode plates 21*a,* 21*b,* 22*a,* 22*b* of the piezoelectric elements. When the contact points of the changeover switch 45 are all changed over to the X side (shown by broken lines in FIG. 17A), the output of the amplifier 43X is connected to the electrode plates 21*a,* 21*b*. Furthermore, the output of the amplifier 44X is connected to the electrode plates 22*a,* 22*b*. Accordingly, the left-hand side electrode plates 21*a,* 21*b* are grouped, and the right-hand side electrode plates 22*a,* 22*b* are grouped. Accordingly, it becomes possible for the elastic body 11 to move in the X-direction.

When the contact points of the changeover switch 45 are all changed over to the Y side (shown by the unbroken lines in FIG. 17), the output of the amplifier 43Y is connected to the electrode plates 21*a,* 22*a,* and the output of the amplifier 44Y is connected to the electrode plates 21*b,* 22*b*. Accordingly, the upper side electrode plates 21*a,* 22*a* are grouped, and the lower side electrode plates 21*b,* 22*b* are grouped. Accordingly, it becomes possible for the elastic member 11 to move in the Y-direction. The generation of elliptical motion in the elastic member 11 in accordance with the eighth embodiment of the present invention will now be described with reference to FIGS. 21A–21D.

Figures 21A, 21B, 21C, 21D:
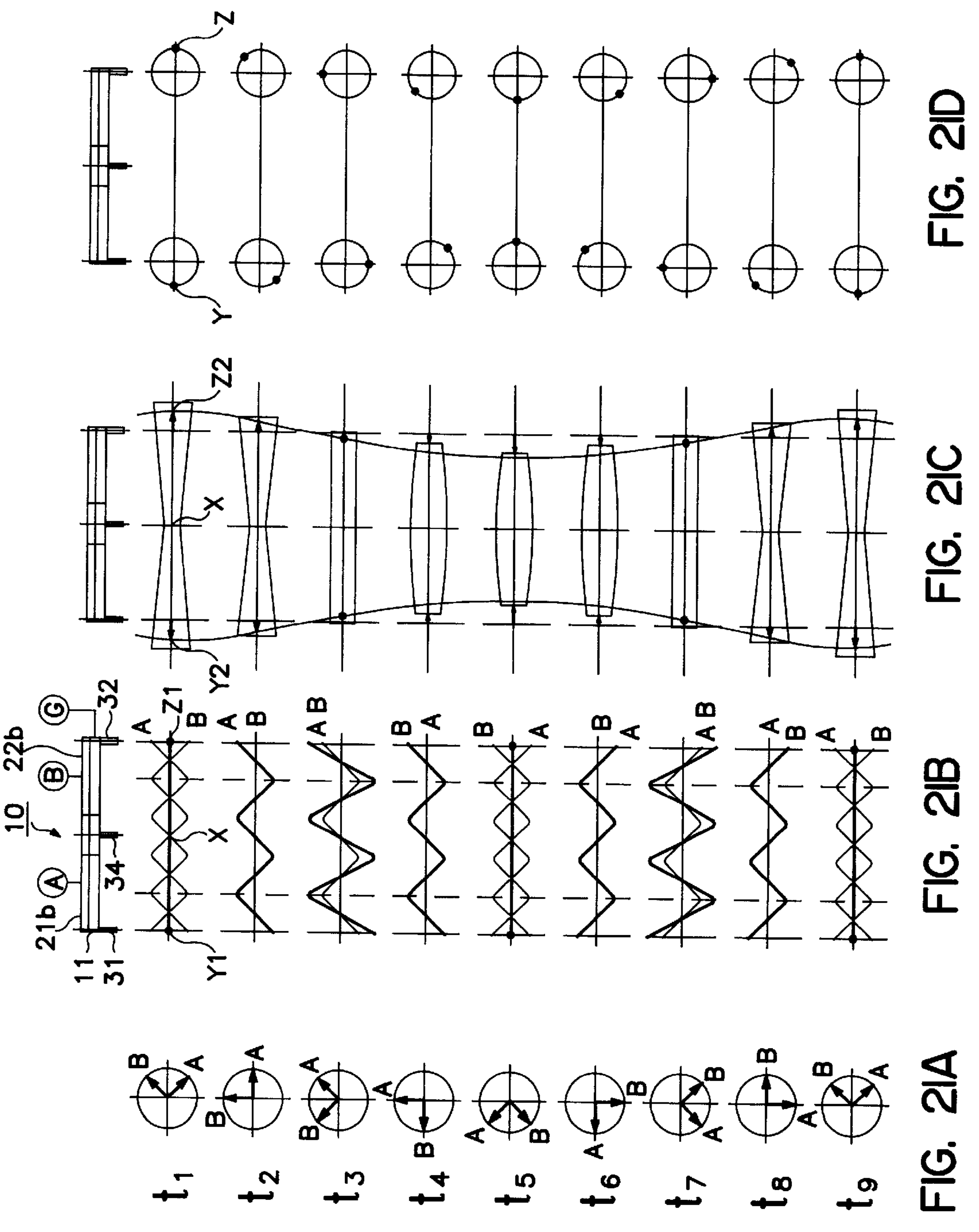
FIGS. 21A–21D are graphs illustrating the operation of the vibration actuator in accordance with the eighth embodiment of the present invention.

FIG. 21A illustrates the changes with respect to time from time t1 to t9 of the 2-phase high frequency voltages A, B input to vibration element 10. In FIG. 21A, the effective values of the high frequency voltages A, B are represented on the abscissa. FIG. 21B illustrates the deformation of a cross section of the vibration element 10 with respect to time (time t1 through time t9) as a result of the bending vibration generated in the vibration element 10. FIG. 21C illustrates the deformation of a cross section of the vibration element 10 with respect to time (time t1 through time t9) as a result of the longitudinal vibration generated in the vibration element 10. FIG. 21D illustrates the changes with respect to time (time t1 through time t9) of the elliptical motion generated in the driving force output members 31, 32 of the vibration element 10.

The generation of elliptical motion in the elastic member 11 in accordance with the eighth embodiment of the present invention will now be described with reference to FIGS. 21A–21D for time t1 through time t9. It is noted that although FIG. 21A–21D illustrate movement in the X-direction, the movement is completely similar for the Y-direction.

As shown in FIG. 21A, at time t1, the high frequency voltage A is a positive voltage, and, similarly, the high frequency voltage B is the same positive voltage. As shown in FIG. 21B, at time t1, the bending vibrations due to the high frequency voltages A, B combine to mutually cancel, and the respective amplitudes of the material point Y1 and the material point Z1 are zero. Further, as shown in FIG. 21C, at time t1, the longitudinal vibration due to the high frequency voltages A, B arises in the direction of elongation, and the material point Y2 and the material point Z2 exhibit maximum elongation, as indicated by the arrows, with the node X as the center. As shown in FIG. 21D, the bending vibration and the longitudinal vibration combine, and the combination of the motions of the material point Y1 and the material point Y2 become the motion of the material point Y. Furthermore, the combination of the motions of the material point Z1 and the material point Z2 become the motion of the material point Z.

At time t2, as shown in FIG. 21A, the high frequency voltage B is zero, and the high frequency voltage A is a positive voltage. As shown in FIG. 21B, at time t2, a bending vibration is generated by the high frequency voltage A, causing the material point Y1 to oscillate in the negative direction, and causing the material point Z1 to oscillate in the positive direction. As shown in FIG. 21C, a longitudinal vibration arises due to the high frequency voltage A, and the material point Y2 and the material point Z2 contract more than at the time t1. As shown in FIG. 21D, the bending vibration and the longitudinal vibration are combined, and the material point Y and the material point Z move further in the counterclockwise direction from their respective positions at time t1.

At time t3, as shown in FIG. 21A, the high frequency voltage A is a positive voltage, and the high frequency voltage B is a negative voltage having the same voltage value as the high frequency voltage A. As shown in FIG. 21B, the bending vibrations generated due to the high frequency voltages A and B combine and are amplified. Specifically, the material point Y1 is amplified in the negative direction more than at time t2, and exhibits a maximum negative amplitude value. Moreover, the material point Z1 is amplified in the positive direction more than at time t2, and exhibits a maximum positive amplitude value. As shown in FIG. 21C, at time t3, the longitudinal vibrations generated due to the high frequency voltages A and B combine and mutually cancel, and the material point Y2 and the material point Z2 return to their respective original positions. As shown in FIG. 21D, at time t3, the bending vibration and the longitudinal vibration combine, and the material point Y and the material point Z move further counterclockwise from their respective positions at time t2.

At time t4, as shown in FIG. 21A, the high frequency voltage A becomes zero, and the high frequency voltage B is a negative voltage. As shown in FIG. 21B, a bending vibration is generated as a result of the high frequency voltage B, and the material point Y1 has a lower negative amplitude than at time t3, while the material point Z1 has a lower positive amplitude than at time t3.

Moreover, as shown in FIG. 21C, a longitudinal vibration is generated by the high frequency voltage B, and the material point Y2 and the material point Z2 contract. As shown in FIG. 21D, the bending vibration and the longitudinal vibration are combined, and the material point Y and the material point Z move further counterclockwise from their respective positions at time t3.

At time t5, as shown in FIG. 21A, the high frequency voltage A is a negative voltage, and, similarly, the high frequency voltage B is the same negative voltage. As shown in FIG, 21B, the bending vibrations due to the high frequency voltages A, B combine to mutually cancel, and respective amplitudes of the material point Y1 and the material point Z1 are zero. Moreover, as shown in FIG. 21C, the longitudinal vibration due to the high frequency voltages A, B causes the material points Y2 and Z2 to contract further from their respective positions at time t4, as shown by the arrows, such that the material point Y2 and the material point Z2 are at a maximum contraction with the node X as the center. As shown in FIG. 21D, the bending vibration and the longitudinal vibration are combined, and the material point Y and the material point Z move further counterclockwise from their respective positions at time t4.

At time t6 through t9, changes in the elastic member 11 occur as a result of the bending vibration and the longitudinal vibration in a manner similar to that described above for times t1–t5. As a result, as shown in FIG. 21D, the material point Y and the material point Z move counterclockwise, and an elliptical motion is generated.

In accordance with the above-described principles, the elastic member 11 generates a drive force via the elliptical motion in the tips of the driving force output members 31–34. Accordingly, when the relative moving member 90 is pressed against the tips of the driving force output members 31–34 by the compressive force of a compression device (not shown in the drawing), the elastic member 11 causes the relative moving member 90 to rotate.

Figure 22:
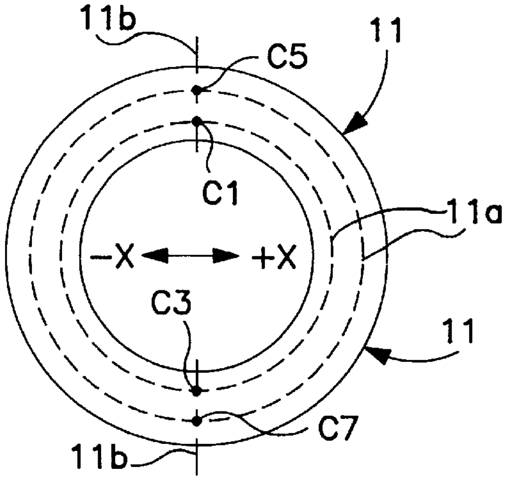
FIG. 22 is a plan view of an elastic member showing the nodal circles and nodal diameters, and the location of the intersection points of both nodes, when driving in the X-direction a vibration actuator in accordance with the eighth embodiment of the present invention.

The connection position of the support members to the elastic member 11 in accordance with the eighth embodiment of the present invention will now be described with reference to FIGS. 22–24. FIG. 22 is a plan view of the elastic member 11 showing the positions of nodal circles 11*a* and diameters 11*b* of the bending vibration (B21 mode) having two nodal circles and one nodal diameter, and showing intersection points C1, C3, C5 and C7 of both nodes, when the elastic member 11 is driven in the X-direction.

Figure 23:
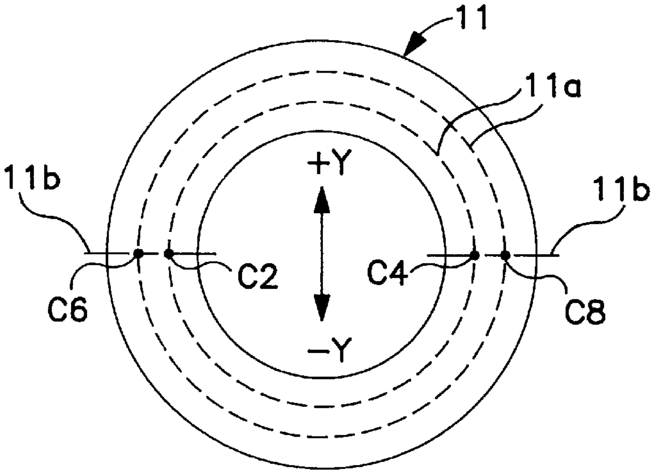
FIG. 23 is a plan view of an elastic member showing the nodal circles and nodal diameters, and the location of the intersection points of both nodes, when driving in the Y-direction a vibration actuator in accordance with the eighth embodiment of the present invention.

FIG. 23 is a plan view of the elastic member 11 showing the positions of nodal circles 11*a* and nodal diameters 11*b* of the bending vibration (B21 mode) having two nodal circles and one nodal diameter, and showing intersection points C2, C4, C6 and C8 of both nodes, when driving the elastic member 11 in the Y-direction.

Figure 24:
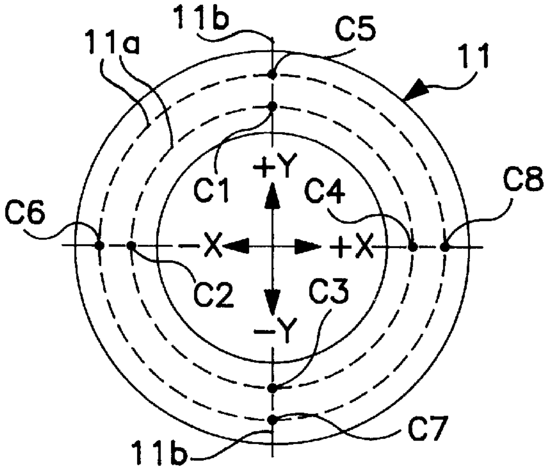
FIG. 24 is a plan view of an elastic member showing the nodal circles and nodal diameters, and the complete superposition of the intersection points of both nodes, in a vibration actuator in accordance with the eighth embodiment embodiment of the present invention.

Furthermore, FIG. 24 is a plan view of the elastic member 11 showing the nodal circles 11*a,* the nodal diameters 11*b,* and the intersection points C1–C8 of both nodes, represented as completely superposed. Moreover, the intersection points C1–C8 do not exist simultaneously. Specifically, the intersection points C1, C3, C5 and C7 exist when driving in the X-direction, and the intersection points C2, C4, C6 and C8 exist when driving in the Y-direction.

By attaching support members at the positions of the nodal circles 11*a* and nodal diameters 11*b,* and at the intersection points C1–C8 of the two nodes, because they become nodes of the bending vibration, obstruction of the vibrations generated in the elastic member 11 can be suppressed to as great an extent as possible.

Moreover, it is desirable to select, as the uniform support positions, the intersection points C1, C3, C5 and C7 when driving in the X-direction, and the intersection points C2, C4, C6 and C8 when driving in the Y-direction. For example, it is desirable to select the intersection points C2, C4, C6 and C8, or the intersection points C1, C2, C3, C4, C5, C6, C7 and C8 as support positions.

Figure 25:
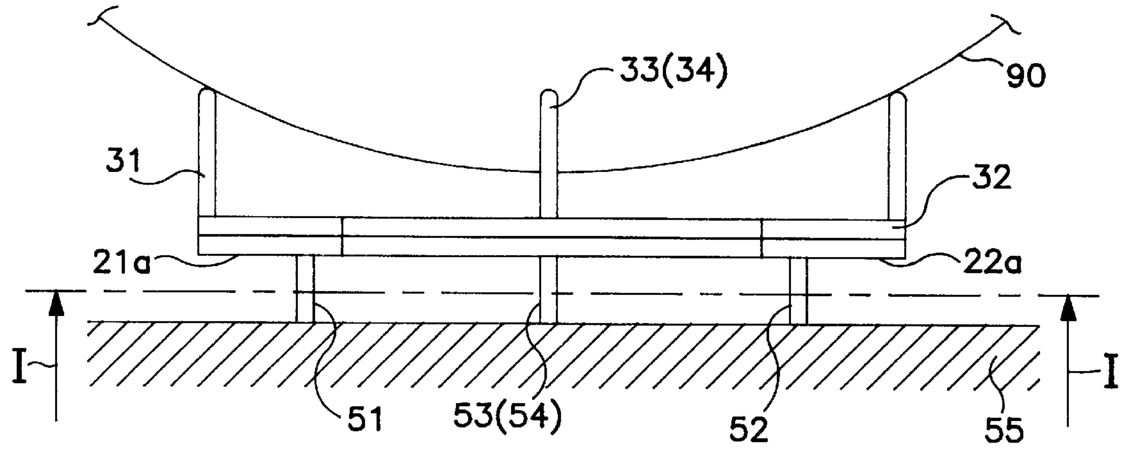
FIG. 25 is a vertical cross section showing the arrangement of a support rod which supports the elastic member of the vibration actuator in accordance with the eighth embodiment of the present invention.
Figure 26:
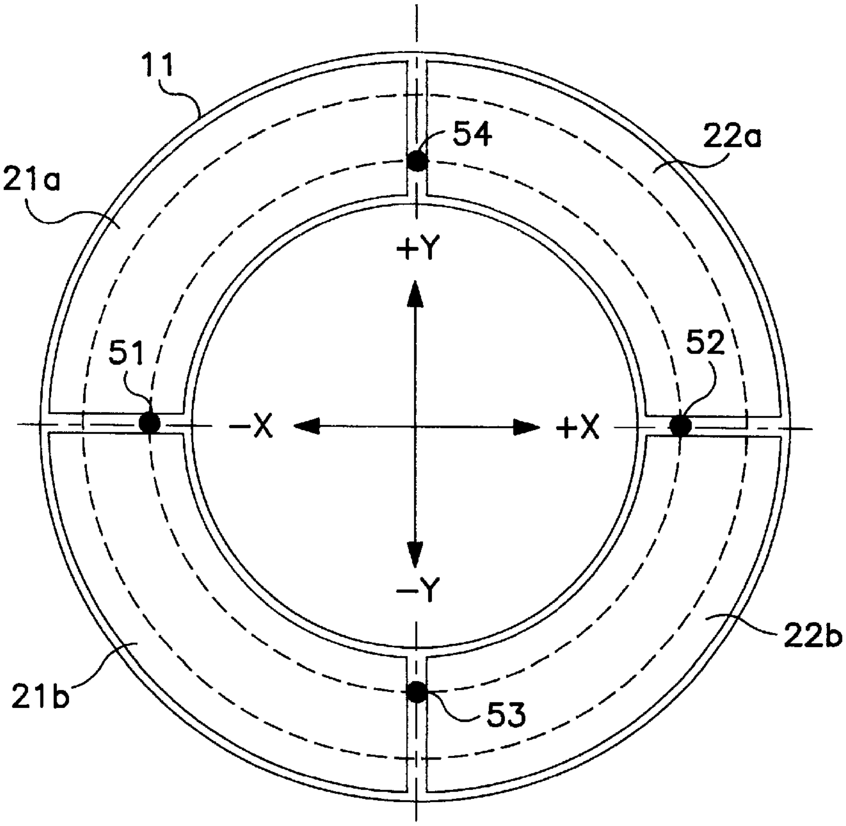
FIG. 26 is a cross section along I—I of FIG. 25 in accordance with the eighth embodiment of the present invention.

FIG. 25 is a vertical sectional diagram showing the arrangement of support rods which support the elastic member 11 in accordance with the eighth embodiment of the present invention. FIG. 26 is a cross-sectional diagram taken along I—I of FIG. 25.

As shown in FIGS. 25 and 26, support rods 51–54 are arranged perpendicularly on the side of the elastic member 11 where the four piezoelectric elements 21*a,* 21*b,* 22*a* and 22*b* are joined to the elastic member 11. As shown in FIG. 26, the support rods 51–54 are arranged respectively between the four quadrant piezoelectric elements 21*a*–22*d.* If the support rods 51–54 are conductive, from the viewpoint of short circuit prevention, they are arranged so that they do not come into contact with the piezoelectric elements 21*a*–22*d.* The respective other ends of the support rods 51–54 are arranged perpendicularly attached to a fixed surface 55.

Furthermore, the tips of the driving force output members 31–34, which are disposed at The plane surface of the elastic member 11 opposite the surface to which the support rods 51–54 are attached, are in contact with the relative moving member 90.

By impressing drive voltages on the piezoelectric elements 21*a*–22*b* from drive sources (not shown in the drawing), a longitudinal vibration which is the first vibration ((R-1 mode: expansion and contraction vibration in the direction of the plane), and a second order bending vibration (B21 mode) are generated, and degeneracy occurs. As a result of the longitudinal and bending vibrations, the elastic member 11 generates elliptical motion at the driving force output members 31–34, and relative motion arises with respect to the relative moving member 90.

During the relative motion, because the elastic member 11 is supported at the position of the nodes of the B21 mode, obstruction of vibration is suppressed to as great an extent as possible, and high drive efficiency is obtained.

Moreover, in accordance with the eighth embodiment of the present invention, the vibration actuator is a R S -B mn type ultrasonic actuator which uses a second order bending vibration having a nodal circle number of two (2) and a nodal diameter number of one (1). However, the present invention is not limited to the case of a nodal circle number of two (2) and a nodal diameter number of one (1), and an R S -B mn ultrasonic actuator which uses a longitudinal vibration as the first vibration and a second order bending vibration as the second vibration, and is supported at the nodal positions of the second order bending vibration, can be equally suitable in a vibration actuator.

Figure 27:
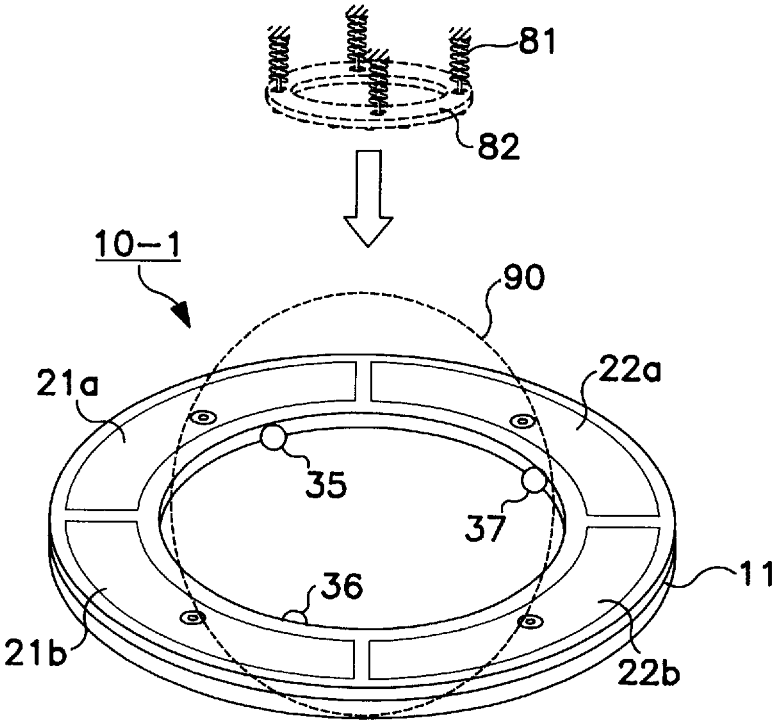
FIG. 27 is an oblique view of a vibration actuator in accordance with a ninth embodiment of the present invention.

FIG. 27 is an oblique view of a multiple degrees of freedom vibration actuator type of drive device in accordance with a ninth embodiment of the present invention, The ninth embodiment of the present invention differs from the eighth embodiment in the arrangement positions of the driving force output members and the number of driving force output members. Accordingly, the description of the like elements in the eighth and ninth embodiments is omitted.

As shown in FIG. 27, spherical driving force output members 35, 36 and 37 are disposed at the inner edge of the circular portion of the annulus of the elastic member 11 of the ultrasonic actuator 10-1 in accordance with the ninth embodiment of the present invention.

The driving force output members 35, 36 and 37 are arranged at three positions mutually offset by 120° from the center of the elastic member 11. Moreover, the driving force output member 35 is located at a position offset by 45° with respect to the position which generates a nodal diameter of the bending motion arising in the elastic member 11. Furthermore, the positions at which the driving force output members 35, 36 and 37 are arranged are positions at approximately equal distances from the center of the elastic member 11.

The positions at which the driving force output member 35, 36 and 37 are arranged in accordance with the ninth embodiment of the present invention confer the same effect during driving with respect to the piezoelectric elements 21*a,* 21*b,* 22*a,* 22*b*. Specifically, chiefly due to the driving force output members 35, 36 and 37 being arranged at positions mutually offset by 120°, two (2) sets of pairs of two (2) vectors are obtained in the elastic member 11 during driving which mutually differ in direction by 180°. In this manner, the four (4) drive vectors which intersect are obtained as a combined vector.

Moreover, in accordance with the ninth embodiment of the present invention, the magnitude of each drive vector becomes equal, chiefly due to the driving force output member 35 being arranged at a position offset by 45° with respect to the position where the nodal diameter of the bending vibration arising in the elastic member 11 occurs.

Thus, in accordance with the ninth embodiment of the present invention, the sum of the drive vectors which act on the driving force output members 35, 36 and 37 have the same magnitude for four (4) directions each mutually differing by 90°. In the above-described manner, the vibration actuator in accordance with the ninth embodiment of the present invention is capable of rectilinear motion in four (4) mutually orthogonal directions if the output voltage is constant.

In accordance with the ninth embodiment of the present invention, it is very easy for all the driving force output members 35, 36, 37 to uniformly contact the relative moving member because the number of locations of the driving force output members 35, 36, 37 is three (3), in comparison with the case of four (4) points. Accordingly, it is possible to greatly suppress the reduction of driving efficiency, Moreover, as shown in FIG. 27, by forming the driving force output members 35, 36 and 37 at the inner edge portions of the annular elastic member 11, the spherical relative moving member 90 can be made to come into contact with the driving force output members 35, 36 and 37 in a state recessed into the central aperture of the elastic member 11. Accordingly, it is possible to design the whole device with a reduced size.

Further, in accordance with the ninth embodiment of the present invention, four (4) compression springs 81, fixed to a fixed unit, and a bearing 82 can be utilized to perform compression, in a manner similar to the second embodiment. However, the ninth embodiment of the present invention is not limited to the type of compression described above. For example, as described with respect to the fourth embodiment, the compression device may produce tension with compression springs 84 from the lower side of the relative moving member 90.

Moreover, in accordance with the ninth embodiment of the present invention, the driving force output members 35, 36 and 37 are arranged in positions which satisfy the three conditions: [1] the three positions of the driving force output members 35, 36, 37 are mutually offset by 120° from the center of the elastic member 11; [2] arrangement in positions offset by 45° with respect to the nodal diameter of the bending vibration arising in the elastic member 11; [3] the driving force output members 35, 36 and 37 are arranged at positions which are approximately equal distance from the center of the elastic member 11. However, some degree of displacement from the arrangement positions defined by the above three conditions is permissible. For example, the driving force output members 35, 36, 37 can be mutually offset by an angle of about 115°–125°. Further, the offset angle defined by condition [2] can be about 42°–48°.

Furthermore, in accordance with the ninth embodiment of the invention shown in FIG. 27, the vibration actuator is a RS -Bmn type of ultrasonic actuator which uses a second order bending vibration having two (2) nodal circles and one (1) nodal diameter, and the driving force output members 35, 36, 37 are formed at three (3) points. However, vibration actuators which include an elastic member having a frame shape, such as described with respect to the first through sixth embodiments of the present invention, may be used. Further, an ultrasonic actuator of the (N, M)) - ((N, M))' type, as described with respect to the tenth embodiment of the present invention described hereinbelow, may be applied in a completely similar manner.

In general, in accordance with embodiments of the present invention, it is desirable to use an elastic member which has an aperture in the elastic member because the relative moving member can be arranged to be recessed in this aperture portion.

Figure 28C:
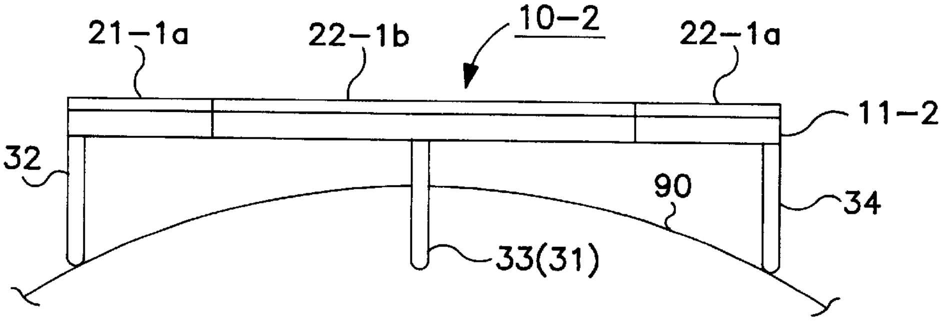
FIG. 28C is a side view of the multiple degrees of freedom vibration actuator type of drive device in accordance with the tenth embodiment of the present invention.
Figure 28A:
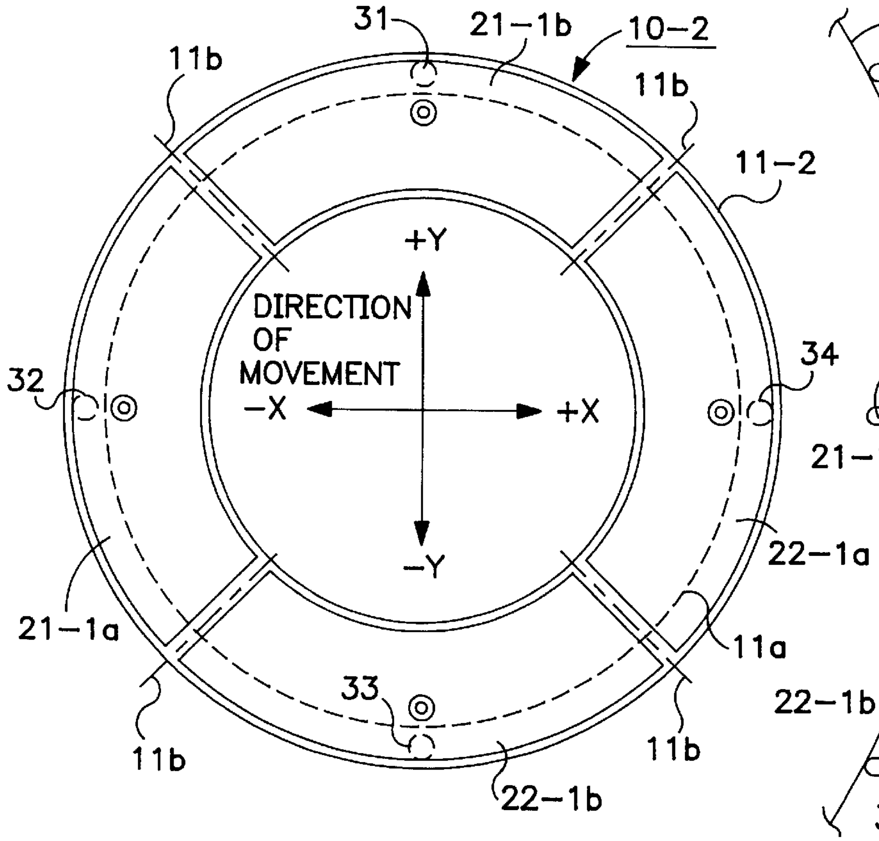
FIG. 28A is a plan view of a multiple degrees of freedom vibration actuator type of drive device in accordance with a tenth embodiment of the present invention.
Figure 28B:
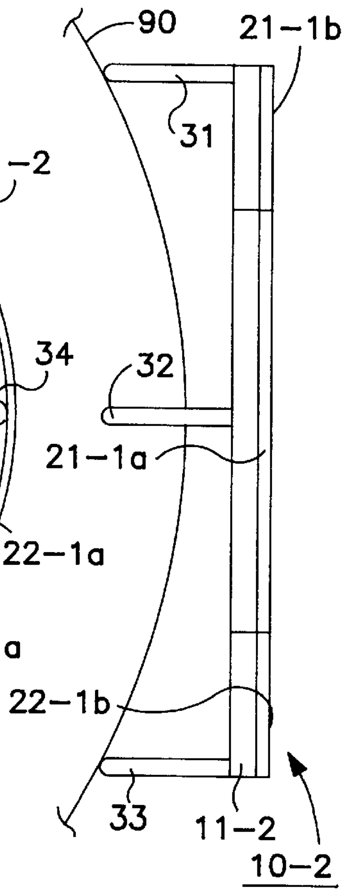
FIG. 28B is a side view of the multiple degrees of freedom vibration actuator type of drive device in accordance with the tenth embodiment of the present invention.
Figure 29:
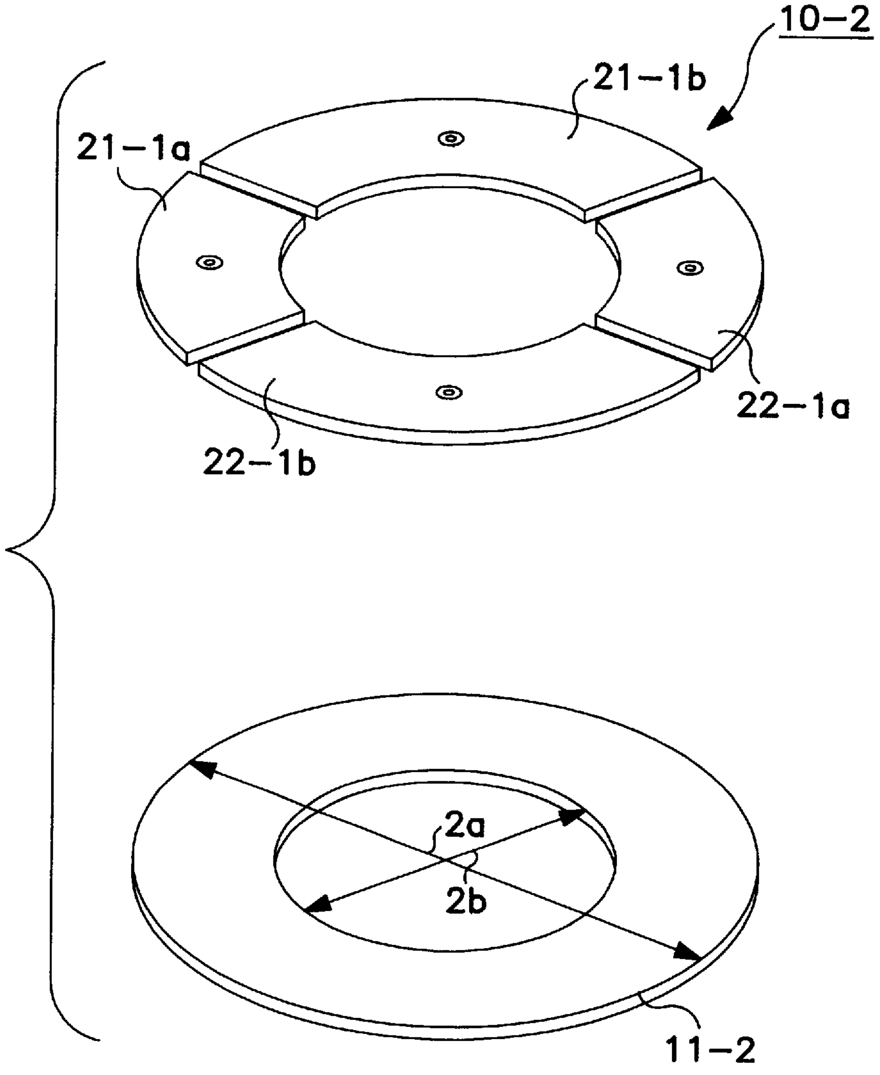
FIG. 29 is an oblique view of an elastic member and piezoelectric element of the vibration actuator in accordance with the tenth embodiment of the present invention.
Figure 30:
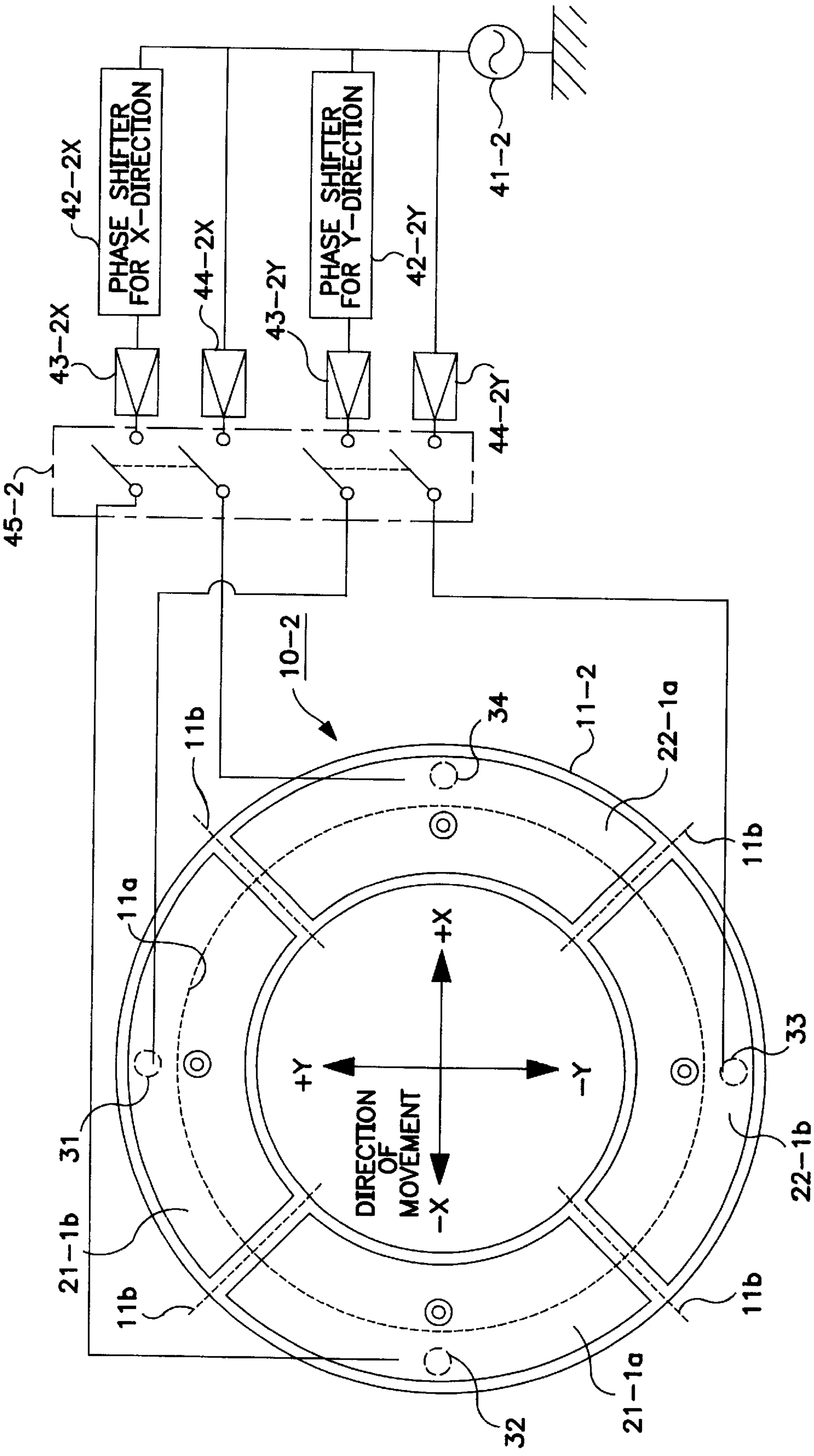
FIG. 30 is a circuit diagram of a drive circuit for the vibration actuator in accordance with the tenth embodiment of the present invention.
Figure 3I:
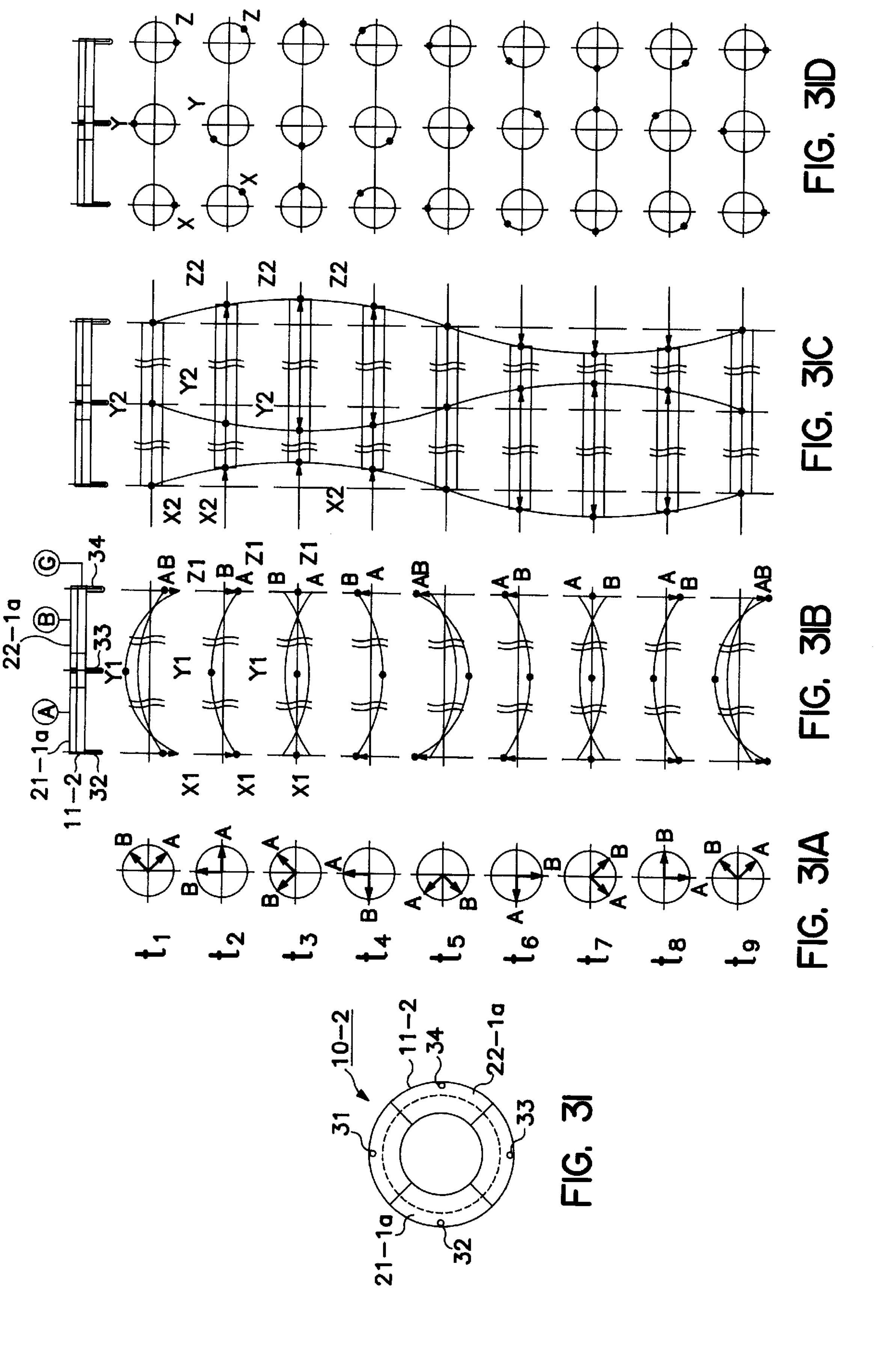

FIGS. 28–31 illustrate a multiple degrees of freedom vibration actuator in accordance with a tenth embodiment of the present invention. More specifically, FIG. 28A is a plan view of the vibration actuator in accordance with the tenth embodiment; FIGS. 28B and 28C are side views of the vibration actuator in accordance with the tenth embodiment; FIG. 29 is an oblique view of an elastic member and piezoelectric elements of the vibration actuator in accordance with the tenth embodiment; FIG. 30 is a plan view of the vibration actuator with a control circuit in accordance with the tenth embodiment; and, and FIGS. 31A–31D are graphs illustrating the operation of the vibration actuator in accordance with the tenth embodiment.

The tenth embodiment of the present invention differs from the eighth embodiment of the present invention chiefly in the point that the ultrasonic actuator is not of the RS -Bmn type, but is of the ((N, M)) - ((N, M))'-Bmn type.

Accordingly, a detailed description of the like elements in the eighth and tenth embodiments will be omitted.

As shown in FIG. 28, in accordance with the tenth embodiment of the present invention, the vibration element 10-2 includes an elastic member 11-2, four piezoelectric elements 21-1*a,* 21-1*b,* 22-1*a,* 22-1*b* and four driving force output members 31–34 in the form of projections on the lower surface of the elastic member 11-2. The four piezoelectric elements 21-1*a,* 21-1*b,* 22-1*a* and 22-1*b* are electromechanical converting elements which are connected, for example affixed, to the upper surface of the elastic member 11-2.

In accordance with the tenth embodiment of the present invention, the piezoelectric elements 21-1*a,* 21-1*b,* 22-1*a,* 22-1*b* are all affixed to the same surface. However, the piezoelectric elements 21-1*a,* 21-1*b* and the piezoelectric elements 22-1*a,* 22-1*b* may be affixed to opposite surfaces of the elastic member 11-2.

As shown in FIG. 29, the annular elastic member 11-2 has an external diameter 2*a,* an internal diameter 2*b,* and a plate thickness T. By selecting the dimensions of the annular elastic member 11-2 (external diameter: 2*a,* internal diameter: 2*b,* plate thickness: t) to fall within certain ranges, which will be described in detail hereinafter, it is possible to bring about coincidence of a non-axisymmetric vibration [((1,1))-((1,1))' mode: in-surface vibration] which is a first vibration, and a second order bending vibration (B21 mode) which is a second vibration.

Specifically, according to the confirmed results by the present inventor, for example, when a drive frequency f=40–60 kHz, an external diameter 2a in the range 40–50 mm, a plate thickness t in the range 1.5–2.0 mm, and a ratio of an internal diameter 2*b* to external diameter 2*a* in the range 0.4–0.6, the non-axisymmetric vibration [((1,1)-((1,1) )' mode: in-surface vibration] and the bending vibration (B21 mode) are made to coincide, and the degeneracy of these two modes of vibration is realized.

In accordance with the tenth embodiment of the present invention, degeneracy of the ((1,1))-((1,1))' mode and the B12 mode occurs, and the broken lines in FIG. 28A indicate the nodal circle 11*a* and nodal diameters 11*b* of the B12 mode bending vibration at this time.

As shown in FIG. 29, the piezoelectric elements 21-1*a,* 21-1*b,* 22-1*a,* 22-1*b* are quadrants of an annulus and are made of PZT or the like. Further, the piezoelectric elements 21-1*a,* 21-1*b,* 22-1*a,* 22-1*b* are polarized and two (2) respective input voltages A, B are impressed thereon.

The driving force output members 31–34 transmit the elliptical motion generated by the combination of the non-axisymmetric vibration and the bending vibration of the elastic member 11-2, and generate relative motion while in contact with the relative moving member 90. As shown in FIG. 28A, the driving force output members 31–34 are disposed at four (4) positions, at equal intervals of 90°, in the vicinity of the external edge of the lower surface of the elastic member 11-2. In accordance with the tenth embodiment of the present invention, hemispheres of silicon nitride, or the like, are mounted at the tips of the driving force output members 31–34 to increase wear resistance.

Furthermore, in accordance with the tenth embodiment of the present invention, it is desirable for the shape of the contact portion of the driving force output members 31–34 to be spherical, ellipsoidal, or the like curved surface such that uniform driving is obtained with respect to both the X-direction and the Y-direction.

Moreover, the piezoelectric elements 21-1*a,* 21-1*b,* 22-1*a,* 22-1*b* may be disposed on the same planar side of the elastic member 11-2 as the driving force output members 31–34. However, when the piezoelectric elements are disposed on the same side of the elastic member as the driving force output members 31–34, to prevent short circuits when using driving force output members 31–34 which are electrically conductive, it is desirable to join the driving force output members by suitable means via insulating material to the surface of the piezoelectric elements 21-1*a,* 21-1*b,* 22-1*a,* 22-1*b*.

Further, in order for the driving force output members 31–34 to effectively transmit the drive force, it is desirable to position the driving force Output members 31–34 to avoid the positions which become nodes of the bending vibration. For example, as shown in FIG. 28A, the driving force output members 31–34 are arranged at the positions of the antinodes of the up and down vibration in a direction approximately perpendicular with respect to the movement plane.

By impressing high frequency voltages A, B on the four piezoelectric elements 21-1*a,* 21-1*b,* 22-1*a,* 22-1*b,* a combination of a non-axisymmetric vibration and a bending vibration is generated in the vibration element 10-2. An elliptical motion is generated at the tips of the driving force output members 31–34 as a result of the combined non-axisymmetric vibration and bending vibration, causing the generation of a drive force. The four piezoelectric elements 21-1*a,* 21-1*b,* 22-1*a,* 22-1*b* are mutually polarized in the same direction. However, the polarization of the four piezoelectric elements 21-1*a,* 21-1*b,* 22-1*a,* 22-1*b* may be in mutually opposite directions. Further, the high frequency voltages A and B have a time phase difference of π/2.

The operation of the drive device for the multiple degrees of freedom vibration actuator in accordance with the tenth embodiment of the present invention will now be described with reference to FIG. 30. An oscillator 41-2 generates a high frequency signal which, after being phase shifted in time by π/2 by an X-direction phase shifter 42-2X and a Y-direction phase shifter 42-2Y, is provided to an X-direction amplifier 43-2X and a Y-direction amplifier 43-2Y, respectively. Further, the high frequency signal from the oscillator 41-2 is directly input to an X-direction amplifier 44-2X and a Y-direction amplifier 44-2Y.

Each of X-direction amplifier 43-2X, Y-direction amplifier 43-2Y, X-direction amplifier 44-2X, and Y-direction amplifier 44-2Y, is respectively connected, via a changeover switch 45-2, to respective piezoelectric elements 21-1*a,* 21-1*b,* 22-1*a,* 22-1*b*. When the contact points of the changeover switch 45-2 are all changed over to the X side, the output of the amplifier 43-2X is connected to the piezoelectric element 21-1*a,* and the output of the amplifier 44-2X is connected to the piezoelectric element 22-1*a*. Accordingly, the pair of piezoelectric elements 21-1*a* and 22-1*a* are grouped, and a one-dimensional movement in the ±X-direction becomes possible.

Similarly, when the contact points of the changeover switch 45-2 are all changed over to the Y side, the output of the amplifier 43-2Y is connected to the piezoelectric element 21-1*b,* and the output of the amplifier 44-2Y is connected to the piezoelectric element 22-1*b*. Accordingly, the opposed piezoelectric elements 21-1*b* and 22-1*b* are grouped, and it becomes possible for the vibration actuator 10-2 to move in the ±Y direction.

The generation of elliptical motion in the vibration element 10-2 will now be described with reference to FIGS. 31A–31D. FIG. 31A illustrates the changes with respect to time of the 2-phase high frequency voltages A, B input to the vibration actuator from time t1 to t9. In FIG. 31A, the effective values of the high frequency voltages A, B are represented on the abscissa. FIG. 31B illustrates the deformation of the side surface of the vibration element 10-2 with respect to time (time t1 through time t9) as a result of the bending vibration generated in the elastic member 11-2. FIG. 31C illustrates the deformation of the cross section of the vibration element 10-2 with respect to time (time t1 through time t9) as a result of the non-axisymmetric vibration generated in the elastic member 11-2. FIG. 31D illustrates the changes with respect to time (time t1 through time t9) of the elliptical motion generated in the material point X, the material point Y and the material point Z of the vibration element 10-2.

The generation of elliptical motion in the elastic member 11-2 in accordance with the tenth embodiment of the present invention will now be described with reference to FIGS. 31A–31D for time t1 through time t9.

As shown in FIG. 31A, at time t1, the high frequency voltage A is a positive voltage, and, similarly, the high frequency voltage B is the same positive voltage. As shown in FIG. 31B, at time t1, the bending vibrations due to the high frequency voltages A, B combine to mutually cancel, and the amplitude of the material point X1 and the material point Z1 show a maximum negative amplitude, while the material point Y1 shows a maximum positive amplitude. As shown in FIG. 31C, the amplitude of the non-axisymmetric vibration due to the high frequency voltages A, B is zero, and the material point X2, the material point Y2 and the material point Z2 are respectively of zero amplitude. As shown in FIG. 31D, the bending vibration and the non-axisymmetric vibration combine, and the combination of the motions of the material point X1 and the material point X2 becomes the motion of the material point X. Further, the combination of the motions of the material point Y1 and the material point Y2 becomes the motion of the material point Y, and the combination of the motions of the material point Z1 and the material point Z2 becomes the motion of the material point Z.

At time t2, as shown in FIG. 31A, the high frequency voltage B is zero, and the high frequency voltage A is a positive voltage. As shown in FIG. 31B, at time t2, the amplitude of the bending vibration generated by the high frequency voltage A decreases, and the amplitude of the bending vibration generated by the high frequency voltage B becomes zero. The respective displacements of the material point X1, the material point Y1, and the material point Z1 decrease. As shown in FIG, 31C, a non-axisymmetric vibration arises due to the high frequency voltage A, and the material point X2 and the material point Z2 are displaced in the upper right-hand direction, and the material point Y2 is displaced in the upper left-hand direction, as shown in the figure. As shown in FIG. 31D, the bending vibration and the non-axisymmetric vibration are combined and the material point X, the material point Y and the material point Z together perform elliptical motion, moving further in the counterclockwise direction from their respective positions at time t1.

At time t3, as shown in FIG. 31A, the high frequency voltage A is a positive voltage, and the high frequency voltage B is the same voltage, but negative. As shown in FIG. 31B, the bending vibration due to the high frequency voltages A and B mutually cancel, producing an amplitude of zero. The displacements of the material point X1, the material point Y1 and the material point Z1 respectively become zero. As shown in FIG. 31C, as a result of the non-axisymmetric vibration due to the high frequency voltages A and B, the material point X2, the material point Y2 and the material point Z2 are displaced maximally, above the plane of the drawing and also to the right, and the material point Y2 is displaced maximally above the plane of the drawing and to the left. As shown in FIG. 31D, the bending vibration and the non-axisymmetric vibration are combined, and the material point X, the material point Y and the material point Z move further counterclockwise from their respective positions at time t2.

At time t4, as shown in FIG. 31A, the high frequency voltage A becomes zero, and the high frequency voltage B becomes a maximum negative value. As shown in FIG. 31B, the amplitude of the bending vibration due to the high frequency voltage B increases, and the displacements of material point X1, the material point Y1 and the material point Z1 respectively increase. Moreover, as shown in FIG. 31C, the displacement amounts of the material points X2 and Z2 above the plane of the figure and to the right, and the displacement of the material pint Y2 above the plane of the figure and to the left, decrease due to the non-axisymmetric vibration due to the high frequency voltages A and B. As shown in FIG. 31D, the bending vibration and the non-axisymmetric vibration are combined, and the material point X, the material point Y and the material point Z move further counterclockwise from their respective positions at time t3.

At time t5, as shown in FIG. 31A, the high frequency voltage A is a negative voltage, and, similarly, the high frequency voltage B is the same negative voltage. As shown in FIG. 31B, the bending vibrations due to the high frequency voltages A, B combine to mutually reinforce, and the amplitudes of the material point X1 and the material point Z1 respectively become a maximum. As shown in FIG. 31C, the amplitude of the non-axisymmetric vibration due to the high frequency voltages A and B decreases, and the amount of displacement of the material point X2, the material point Y2 and the material point Z2 all become zero. As a result, as shown in FIG. 31D, the bending vibration and the non-axisymmetric vibration are combined, and the material point X, the material point Y, and the material point Z move further counterclockwise from their respective positions at time t4.

At times t6 through t9, changes in the elastic member 11-2 occur from the bending vibration and the non-axisymmetric vibration in a manner similar to that described above for times t1–t5. As a result, as shown in FIG. 31D, the material point X, the material point Y and the material point Z move counterclockwise, and an elliptical motion is generated.

In accordance with the above-described principles, the vibration element 10-2 generates a drive force via the elliptical motion at the tips of the driving force output members 31–34, as shown in FIG. 31D. Accordingly, when the relative moving member 90 is pressed against the respective tips of the driving force output members 31–34 by the compressive force of a compression device (not shown), the elastic member 11-2 causes the relative moving member 90 to rotate.

As shown in FIG. 31D, at time t1 through time t3, the driving force output members 32 and 34 come into contact with the relative moving member while performing a counterclockwise elliptical motion. As a result, the relative moving member 90 rotates to the upper right-hand side of the figure. Furthermore, at time t7 through time t9, the driving force output member 32 and 34 come into contact with the relative moving member 90 while performing counterclockwise elliptical motion so that the relative moving member 90 rotates to the upper right direction in the figure.

By repetition of the above operations, the elastic member 11-2 rotates the relative moving member 90 in a counter clockwise direction as shown in FIG. 28.

Figure 32A:
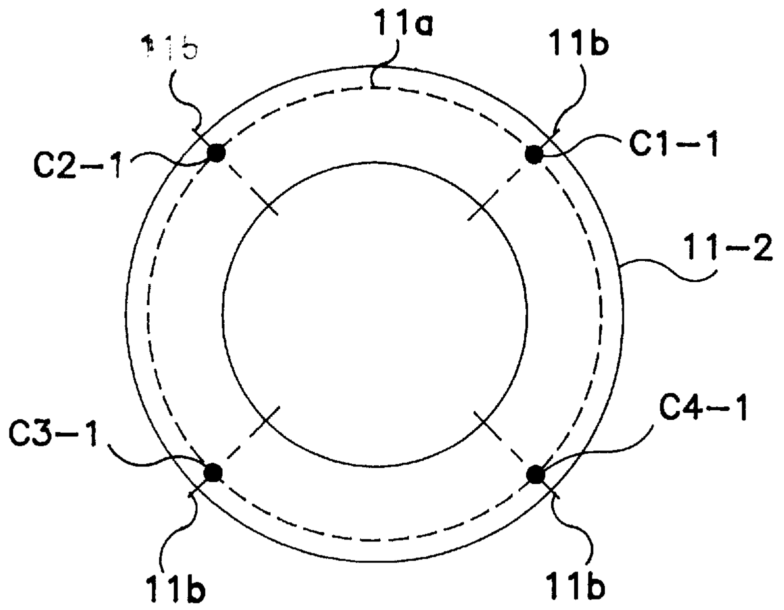
FIG. 32A is a plan view showing the nodal circle and nodal diameters of the vibration actuator in accordance with the tenth embodiment of the present invention.

FIG. 32A is a plan view showing the position of a nodal circle 11*a* and nodal diameters 11*b* of the second order bending vibration in the vibration actuator in accordance with the tenth embodiment of the present invention. As shown in FIG. 32A, one nodal circle 11*a* and two nodal diameters 11*b,* and their intersection points C1-1, C2-1, C3-1, C4-1, are generated in the elastic member 11-2 when driving the vibration element 10-2.

The nodal circle 11*a* and nodal diameters 11*b* and the intersection points C1-1, C2-1, C3-1, C4-1 of the nodal circle 11*a* and nodal diameters 11*b* all become nodes of the bending vibration. By positioning support member 51–54 at these positions, hindrance to vibrations arising in the elastic member 11-2 can be reduced to as great an extent as possible.

Figure 32B:
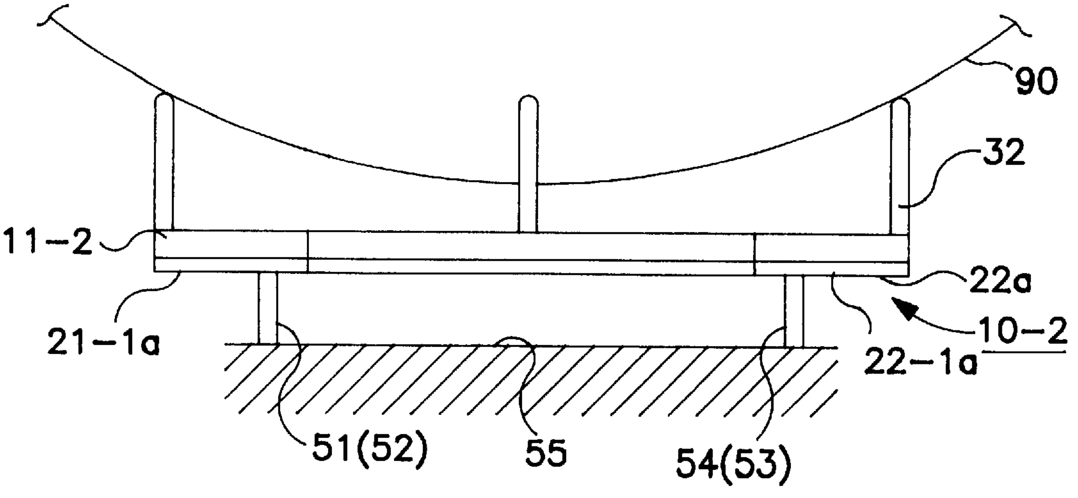
FIG. 32B is a side view showing the support structure of the vibration actuator in accordance with the tenth embodiment of the present invention.
Figure 33:
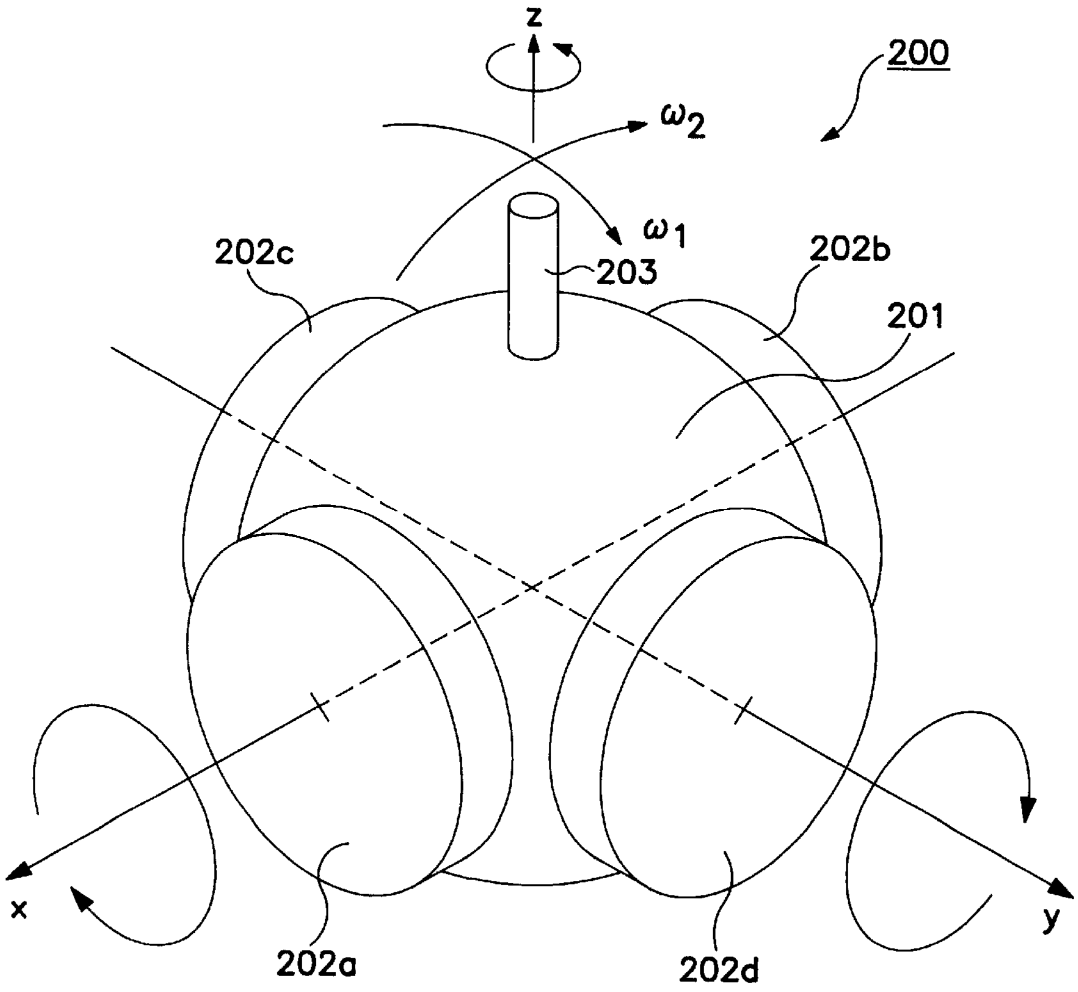
FIG. 33 is an oblique view of a prior art multiple degrees of freedom vibration actuator.

FIG. 32B is a vertical sectional view showing the arrangement of the support rods 51–54 in accordance with the tenth embodiment of the present invention, The support rods 51–54 are disposed on the contact surface side of the four quadrant shaped piezoelectric elements 21-1*a,* 21-1*b,* 22-1*a,* 22-1*b* joined to the elastic member 11-2. The support rods 51–54 are respectively arranged between the four quadrant shaped piezoelectric elements 21-1*a,* 21-1*b,* 22-1*a,* 22-1*b.* The support rods 51–54 are arranged so that they do not contact the four piezoelectric elements 21-1*a,* 21-1*b,* 22-1*a,* 22-1*b.* The respective other ends of the support rods 51–54 are fixed to a fixed surface 55. Furthermore, the driving force output members 31–34 of the elastic member 11-2 supported by the support rods 51–54 come into contact with the relative moving member 90.

By impressing drive voltages on the piezoelectric elements 21-1*a,* 21-1*b,* 22-1*a,* 22-1*b* from a drive source (not shown in the drawing), a non-axisymmetric vibration ((1,1) )-((1,1))' mode, and a second order bending vibration (B21 mode) are generated and degeneracy occurs. In this manner, elliptical motion is generated by the driving force output members 31–34, and the relative moving member 90 is rotated.

During the relative motion of the relative moving member 90, the elastic member 11 is supported by the support rods 51–54 which have been arranged at the nodal positions of the B21 mode. Accordingly, hindrance to vibration is suppressed to great an extent as possible, and high driving efficiency is obtained.

Moreover, in accordance with the tenth embodiment of the present invention, the vibration actuator is a ((N, M))-((N, M))'-B mn type of ultrasonic actuator which generates a second order bending vibration having one (1) nodal circle and two (2) nodal diameters. However, the tenth embodiment of the present invention is not limited to a vibration actuator which generates one (1) nodal circle and two (2) nodal diameters, and the tenth embodiment may use a ((N, M))-((N, M))'-B mn type of ultrasonic actuator in the nodal positions of 2-dimensional bending vibrations.

The present invention is not limited to the various embodiments described hereinabove, and various modifications and alterations which fall within the scope of the present invention are possible. For example, the electromechanical converting elements have been described as piezoelectric elements. However, electrostrictive or magnetostrictive elements may be used as the electromechanical converting elements.

Moreover, in accordance with the various embodiments if the present invention described hereinabove, an ultrasonic type vibration actuator was employed. However, the present invention is not limited to an ultrasonic type vibration actuator, and it is equally applicable to vibration actuators which use other vibration regions.

Furthermore, in accordance with the embodiments of the present invention described above, the ultrasonic actuators are of the 4 LB type, RS B mn type, ((1,1))-(1,1 )'Bmn type, and the like. However, the present invention is not limited to these types of ultrasonic actuators, and other types of ultrasonic actuators may be used with the present invention, such as vibration actuators which are self-propelled or otherwise propelled.

Although preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. A multiple degrees of freedom vibration actuator, comprising:

a flat plate shaped elastic member;

a driving force output member attached to and projecting from the flat plate shaped elastic member; and an electromechanical conversion element attached to a surface of the flat plate shaped elastic member, the electromechanical conversion element being excited by impressing a voltage thereon to generate a driving motion of the driving force output member in directions of at least two axes; and a relative moving member having a curved surface contacting the driving force output member to produce relative motion with respect to the vibration element.

2. A multiple degrees of freedom vibration actuator as recited in claim 1, wherein the relative moving member is approximately spherical.

3. A multiple degrees of freedom vibration actuator as recited in claim 1, wherein the driving force output member includes at least three members projecting from the flat plate shaped elastic member.

4. A multiple degrees of freedom vibration actuator as recited in claim 1, wherein a lowest characteristic frequency of the driving force output member is higher than a drive frequency range of the elastic member.

5. A multiple degrees of freedom vibration actuator as recited in claim 4, wherein a lowest characteristic frequency of the driving force output member is a resonant frequency of a bending vibration mode of the elastic member.

6. A multiple degrees of freedom vibration actuator as recited in claim 1, further comprising a compression member to produce compressive contact between the relative moving member and the driving force output member.

7. A multiple degrees of freedom vibration actuator as recited in claim 6, wherein the compression member includes a rotation support member in rolling contact with the relative moving member.

8. A multiple degrees of freedom vibration actuator as recited in claim 1, further comprising a rotary transmission member between the driving force output member and the relative moving member to transmit the drive force to the relative moving member.

9. A multiple degrees of freedom vibration actuator as recited in claim 8, wherein the rotary transmission member is a sphere.

10. A multiple degrees of freedom vibration actuator as recited in claim 1, wherein the flat plate shaped elastic member is a polygonal frame shaped elastic member with a pair of opposing members in a rectangular parallelopipedal form, the driving force output member being attached to the elastic member at predetermined positions, and electromechanical converting elements contacting a surface of the elastic member to convert a drive voltage impressed on the electromechanical converting elements into mechanical motion, wherein the excitation of the electromechanical converting elements generates a longitudinal vibration in a direction approximately parallel to an approximately planar surface which includes points of contact between the driving force output member and the relative moving member, and generates a bending vibration in a direction intersecting the approximately planar surface, the longitudinal and bending vibrations generating the drive force to produce relative motion between the driving force output member and the relative moving member.

11. A multiple degrees of freedom vibration actuator as recited in claim 1, wherein the flat plate shaped elastic member is a rectangular parallelopipedal elastic member having the driving force output member attached at a predetermined position, and an electromechanical converting element joined to a surface of the elastic member, the electromechanical converting element being excited by impressing a drive voltage thereon, and in response to a first drive voltage impressed on the electromechanical converting element, a longitudinal vibration is generated in a direction approximately parallel to an approximately planar surface which includes points of contact between the driving force output member and the relative moving member, and a bending vibration is generated in a direction intersecting the approximately planar surface, the longitudinal and bending vibrations generating a drive force to produce relative motion between the driving force output member and the relative moving member in a first direction, in response to a second drive voltage impressed on the electromechanical converting element, a longitudinal vibration is generated in a direction approximately parallel to the approximately planar surface which includes the points of contact between the driving force output member and the relative moving member, and a bending vibration is generated in a direction intersecting the approximately planar surface, the longitudinal and bending vibrations generating a drive force to produce relative motion between the driving force output member and the relative moving member in a second direction.

12. A multiple degrees of freedom vibration actuator as recited in claim 1, wherein the flat shaped elastic member is an annular shaped elastic member having the driving force output member attached at a predetermined position, and an electromechanical converting element joined to a surface of the elastic member, wherein an excitation of the electromechanical converting element generates a longitudinal vibration in the elastic member, causing a displacement of the annular shaped elastic member in a direction in which a diameter of the annular shaped elastic member widens and in a direction in which the diameter contracts, and generates bending vibration in a direction which intersects the direction of the longitudinal vibration, the bending vibration having a nodal circle and a nodal diameter, the longitudinal and bending vibration generating a drive force to produce relative motion between the driving force output member and the relative moving member.

13. A multiple degrees of freedom vibration actuator as recited in claim 1, wherein the flat plate shaped elastic member is an annular shaped elastic member, the driving force output member being attached to the elastic member at a predetermined position, and an electromechanical converting element joined to a surface of the elastic member, wherein excitation of the electromechanical converting element generates non-axisymmetric vibration in the annular shaped elastic member, the non-axisymmetric vibration causes displacement of the annular shaped elastic member in the non-axisymmetric direction, and generates bending vibration in the annular shaped elastic member in a direction which intersects the direction of vibration in the non-axisymmetric direction, the bending vibration having a nodal circle and a nodal diameter, the non-axisymmetric vibration and the bending vibration generating a drive force to produce relative motion between the driving force output member and the relative moving member.

14. A multiple degrees of freedom vibration actuator as recited in claim 10, wherein the driving force output member is formed at an inner edge portion of the frame shaped elastic member.

15. A multiple degrees of freedom vibration actuator as recited in claim 12, wherein the driving force output member is formed at an inner edge portion of the frame shaped elastic member.

16. A multiple degrees of freedom vibration actuator as recited in claim 13, wherein the driving force output member is formed at an inner edge portion of the frame shaped elastic member.

17. A multiple degrees of freedom vibration actuator as recited in claim 1, wherein the relative moving member is hollow.

18. A multiple degrees of freedom vibration actuator as recited in claim 1, wherein the driving force output member is used in a position setting stage.

19. A multiple degrees of freedom vibration actuator as recited in claim 1, wherein the driving force output member is used in an optical axis correction device of an optical instrument.

20. A multiple degrees of freedom vibration actuator as recited in claim 1, wherein the driving force output member is used in a rotary coupling unit of a robot.

21. A vibration actuator, comprising:

a quadrangular frame shaped elastic member including driving force output members approximately at the vertices of the quadrangular frame shaped elastic member;

electromechanical converting elements attached to the respective sides of the frame shaped elastic member, the electromechanical converting elements being excited by impressing a voltage thereon to generate a driving motion of the driving force output members in directions of at least two axes; and a relative moving member having a curved surface contacting the driving force output members to produce relative motion with respect to the frame shaped elastic member in the at least two axes directions.

22. A vibration actuator as recited in claim 21, wherein the relative moving member is framed by the frame shaped elastic member.

23. A vibration actuator as recited in claim 21, further comprising a compression member to produce compressive contact between the relative moving member and the elastic member.

24. A vibration actuator as recited in claim 23, wherein the compression member includes a rotation support member in rolling contact with the relative moving member.

25. A vibration actuator as recited in claim 21, wherein the driving force output members include a rotary transmission member contacting the relative moving member to transmit the drive force to the relative moving member.

26. A vibration actuator as recited in claim 25, wherein the rotary transmission member is a sphere.

27. A vibration actuator as recited in claim 21, wherein the relative moving member is spherical.

28. A vibration actuator as recited in claim 21, wherein the relative moving member has a hemispherical form and includes a flat surface portion.

29. A vibration actuator as recited in claim 21, wherein the relative moving member has a hemispherical form with a hollow central portion.

30. A vibration actuator as recited in claim 27, wherein the spherical relative moving member includes a rod-shaped member joined to a portion of the spherical relative moving member.

31. A vibration actuator as recited in claim 21, wherein the positions of the vertices of the framed shaped elastic member are selected to avoid nodes of longitudinal vibration of the framed shaped elastic member.

32. A vibration actuator, comprising:

a flat rectangular shaped elastic member;

a plurality of driving force output members formed on a first surface of the flat rectangular shaped elastic member;

a plurality of rectangular electromechanical converting elements attached to a second surface of the flat rectangular shaped elastic member, opposite the first surface, the electromechanical converting elements being excited by impressing a voltage thereon to generate driving motion of the driving force output members in directions of at least two axes; and a relative moving member having a curved surface contacting the driving force output members to produce relative motion with respect to the flat rectangular shaped elastic member in the at least two axes directions.

33. A vibration actuator, comprising:

an annular shaped elastic member;

a plurality of driving force output members formed on a first surface of the annular shaped elastic member;

a plurality of electromechanical converting elements attached to a second surface of the annular shaped elastic member, opposite the first surface, the electromechanical converting elements being excited by impressing a voltage thereon to generate driving motion of the driving force output members in directions of at least two axes; and a relative moving member having a curved surface contacting the driving force output members to produce relative motion with respect to the annular shaped elastic member in the at least two axes directions.

34. A vibration actuator as recited in claim 33, wherein the plurality of electromechanical converting elements have respective annular forms corresponding to the annular shaped elastic member.

35. A vibration actuator as recited in claim 33, wherein the driving force output members are arranged at four positions on the annular shaped elastic member separated by 90°.

36. A vibrator actuator as recited in claim 34, wherein the driving force output members comprise hemispherical bodies on the respective tips of the driving force output members.

* * * * *